US012566483B2

(12) United States Patent
Jha et al.

(10) Patent No.: US 12,566,483 B2
(45) Date of Patent: Mar. 3, 2026

(54) CONTROLLER AND METHODS THEREOF

(71) Applicant: Intel Corporation, Santa Clara, CA (US)

(72) Inventors: Satish Jha, Portland, OR (US); S M Iftekharul Alam, Hillsboro, OR (US); Leonardo Gomes Baltar, Munich (DE); Suman Sehra, Folsom, CA (US); Vesh Raj Sharma Banjade, Portland, OR (US); Andradige Silva, Portland, OR (US); Kathiravetpillai Sivanesan, Portland, OR (US); Soo Jin Tan, Shanghai (CN); Arvind Merwaday, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 18/552,454

(22) PCT Filed: Jun. 25, 2021

(86) PCT No.: PCT/CN2021/102562
§ 371 (c)(1),
(2) Date: Sep. 26, 2023

(87) PCT Pub. No.: WO2022/267067
PCT Pub. Date: Dec. 29, 2022

(65) Prior Publication Data
US 2024/0160269 A1    May 16, 2024

(51) Int. Cl.
G06F 1/32      (2019.01)
G06F 1/3206   (2019.01)
G06F 1/3234   (2019.01)

(52) U.S. Cl.
CPC .......... G06F 1/3206 (2013.01); G06F 1/3234 (2013.01)

(58) Field of Classification Search
CPC ........................... G06F 1/3206; G06F 1/3234
See application file for complete search history.

(56) References Cited

U.S. PATENT DOCUMENTS

2002/0177942 A1 *  11/2002  Knaian .................... G08G 1/02
                                                              340/907
2010/0332876 A1    12/2010  Fields, Jr et al.
(Continued)

OTHER PUBLICATIONS

International search report issued for the corresponding international patent application No. PCT/CN2021/102562, dated Mar. 15, 2022, 2 pages (for informational purposes only).

*Primary Examiner* — Stefan Stoynov
(74) *Attorney, Agent, or Firm* — VIERING, JENTSCHURA & PARTNER mbB

(57) ABSTRACT

A controller is provided. The controller comprises a processor configured to determine multiple power saving modes based on a power saving model of a network communicative road sensing system and on a power saving target assigned to the road sensing system; the multiple power saving modes comprising a first power saving mode for a first power consuming subsystem of the road sensing system and a second power saving mode for a second power consuming subsystem of the road sensing system; generate a recommendation for the road sensing system to operate in accordance with the multiple power saving modes.

15 Claims, 13 Drawing Sheets

(56)           References Cited

U.S. PATENT DOCUMENTS

| | | | |
|---|---|---|---|
| 2014/0244145 A1* | 8/2014 | Neel | G08G 1/042 |
| | | | 701/117 |
| 2016/0266634 A1 | 9/2016 | Chuang | |
| 2017/0238258 A1 | 8/2017 | Ramalho De Oliveira et al. | |
| 2019/0080602 A1* | 3/2019 | Rice | G05D 1/0088 |
| 2019/0327580 A1 | 10/2019 | Chang et al. | |
| 2020/0310526 A1 | 10/2020 | De Beus | |

* cited by examiner

| 1302 | 1210 |
|------|------|

1212

1301

801

Recommended PSL

PST

Multiple PSM

CONTROLLER AND METHODS THEREOF

This is a national phase of PCT Application PCT/CN2021/102562, which was filed on Jun. 25, 2021, the entire contents of which are incorporated herein by reference.

TECHNICAL FIELD

Various aspects of this disclosure generally relate to a controller and methods thereof.

BACKGROUND

In future smart road network and smart cities, a large number of specific infrastructures may be added to the road infrastructure to provide support for sensing, processing, computation and communication. Such specific infrastructure will increase the power consumption, and thus will exhaust the available resources.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which:

FIG. 1 shows an exemplary road sensor system in accordance with various aspects of the present disclosure;

DESCRIPTION

Figure 2:
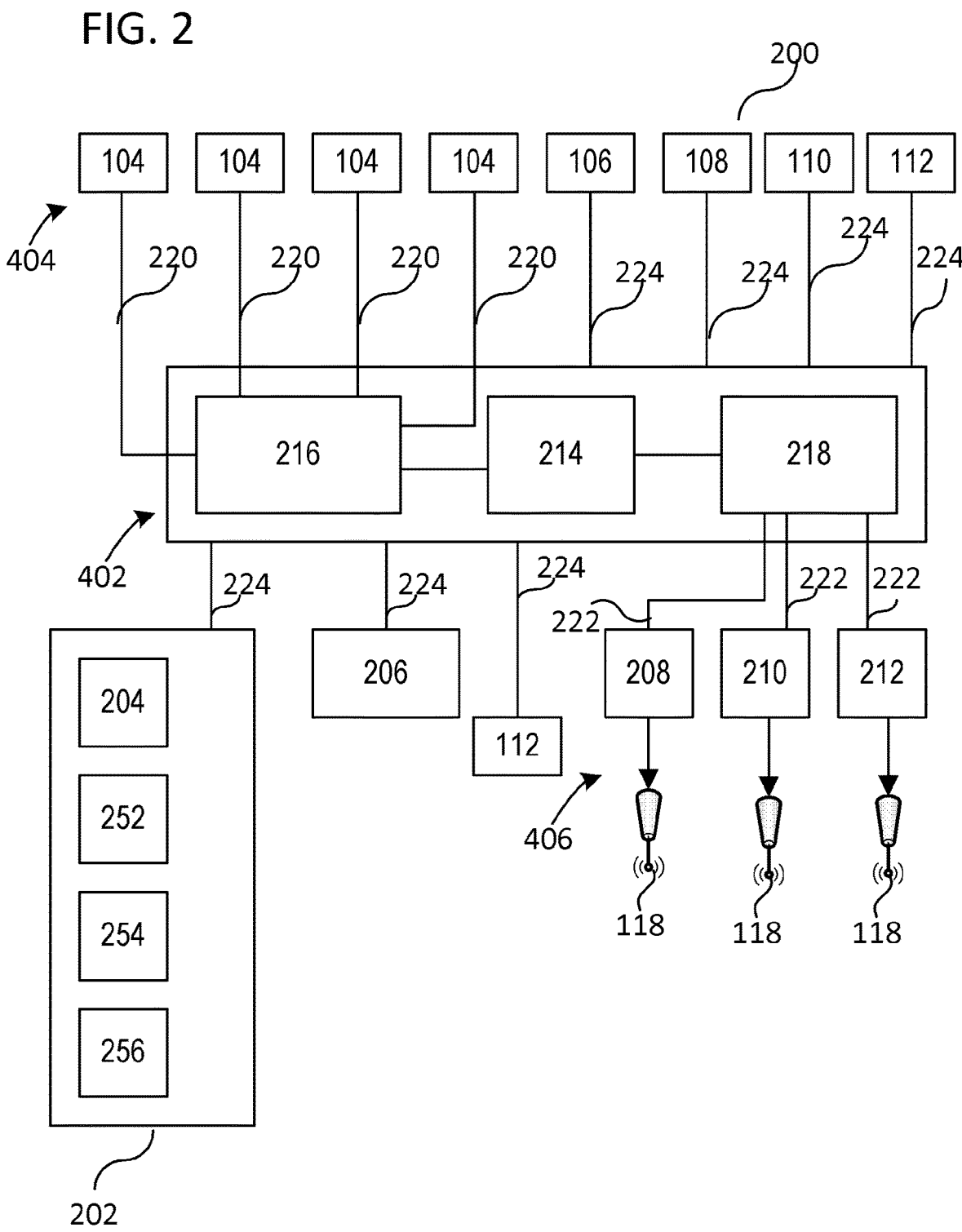
FIG. 2 shows various exemplary system infrastructure of a road sensor system of the vehicle in accordance with various aspects of the present disclosure.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as used herein may be understood as any kind of technological entity that allows handling of data. The data may be handled according to one or more specific functions that the processor or controller may execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphic Processing Unit (GPU), integrated Graphics Processing Unit (iGPU), dedicated Graphics Processing Unit (dGPU), Digital Signal Processor (DSP), Vision processing unit (VPU), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" as used herein may be understood as a computer-readable medium (e.g., a non-transitory computer-readable medium), in which data or information may be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where radio-layer components carry out the physical transmission and reception, such as radio frequency (RF) transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions. The term "calculate" encompasses both 'direct' calculations via a mathematical expression/formula/relationship and 'indirect' calculations via lookup or hash tables and other array indexing or searching operations.

A "system" may be understood to include various interacting (e.g., communicating) subsystems. A subsystem is a set of components and is one of multiple components of a system of a higher level (k). The subsystem may, on the level (k−1) of the subsystem, be seen as a system itself. When the subsystem is seen as system itself, its components may be seen as subsystems, and so on. Examples of subsystems include physical subsystems or immaterial subsystems. Examples of a physical subsystem may include electric subsystems; data processing subsystems; sensing subsystems; communicating subsystems; energy storing subsystems, energy converting subsystems and the like. Examples of a immaterial subsystem may include a data based subsystems (e.g., a model, a database, software, and the like).

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others. As an example, a vehicle may be a "ground vehicle", which may be understood to include any type of vehicle, as described above, which is configured to traverse the ground, e.g., on a street, on a road, on a track, on one or more rails, off-road, etc.

As an example, a vehicle, as references herein, may be a "autonomous vehicle", which may be understood to include a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that may operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that may operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

Herein the term "collaborate", "collaborative", "collaboration" refers to entities, such as systems, devices (a plurality of systems), methods and functions, as examples, participating to provide a service (also referred to as work), e.g., achieve an objective and/or process a task. Examples of the collaborative entities may include various types of road sensing systems. Multiple entities (e.g., road sensing systems) participating in providing the service may be affiliated (e.g., assigned) to a group (herein also referred to as group, swarm or as team), e.g., being members (also referred to as agents or as nodes) of the group. Multiple road sensing systems participating in providing the service may be affiliated (e.g., assigned) to a group of road sensing systems (also referred to as PSG), e.g., being members (also referred to as agents or as nodes) of the group of road sensing systems. Each member of the group (e.g., of road sensing systems) may be entrusted to provide one or more services, e.g., which the member exclusively provides. Examples of such services may include: sensing service (e.g., for a specific area), monitoring service (e.g., for a specific area), data routing service, communication service, navigational service, data processing service and the like. The members of the group may be configured to collaborate with each other, e.g., by implementing one or more protocols (also referred to as collaboration protocols). Examples of collaboration protocols may include: a protocol for group management (also referred to as group management protocol), a protocol for communication (e.g., data exchange) between members of a group (also referred to as group communication protocol), a protocol for resource management (also referred to as resource management protocol).

Generally, a protocol may define rules that indicate the format, syntax, semantics and/or synchronization of information, e.g., of information transfer (e.g., exchange), information storage, information processing, and the like. For example, one or more road sensing systems may form, join and/or leave a group in accordance with the group management protocol. For example, the members of the group may be configured to communicate with each other in accordance with the group communication protocol. For example, the members of the group may be configured to exchange environmental information or exchange resource information with other members of the group in accordance with the group communication protocol (also referred to as data exchange protocol). For example, a group identifier may be configured to route a message (which is in accordance with the group communication protocol) to the group. Generally, a the message generating entity may be configured to generate and/or transmit the message (Msg) in accordance with a network communication protocol, e.g., being of a higher level than the one or more collaboration protocols).

Various embodiments herein may utilize one or more models to perform or control functions of a system (or other functions described herein). The term "model" may, for example, used herein may be understood as any kind of algorithm, which provides output data from input data (e.g., any kind of algorithm generating or calculating output data from input data).

As an example, a model may be configured to simulate human intelligence, which, in this case, is also referred to as artificial intelligence (AI) model. An AI model may be a pile of if-then statements, or a complex statistical model mapping raw sensory data to symbolic categories. The if-then statements may be simply rules explicitly programmed by a human hand. Taken together, these if-then statements may be called rules engines, expert systems, knowledge graphs or symbolic AI.

In other aspects, the model may configured to be formed, e.g., updated, by machine learning (also referred to as ML), which, in this case, is also referred to as machine learning model. A machine learning model may be executed by a computing system to progressively improve performance of a specific task. In some aspects, machine learning model may be configured to update itself, e.g., during a training phase, in which the machine learning model processes training data. In some aspects, parameters of a machine learning model may be updated during the training phase based on the training data. A trained machine learning model may be used during an inference phase to provide determination (e.g., predictions, selections, categorizations, decisions, estimations, and the like) based on input data. In some aspects, the trained machine learning model may be used to generate additional training data. An additional machine learning model may be updated during a second training phase based on the generated additional training data. A trained additional machine learning model may be used during an inference phase to provide determination (e.g., predictions, selections, categorizations, decisions, estimations, and the like) based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

As an example, a model may configured to classify (also referred to as classification model), thus implementing a classifier. In a classification model, the output of the model may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

As an example, a model may configured to regress (also referred to as regression model). A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

An exemplary implementation of a model as disclosed herein may be or may include a neural network (NN). The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, deep neural network (DNN) and the like. The neural network may include any number of layers. The training of the neural network (e.g., adapting the layers of the neural network) may use or may be based on any kind of training principle, such as backpropagation (e.g., using the backpropagation algorithm).

In the following, reference is made to various systems (also referred to as road sensor systems) configured to sense a road (and optionally its environment), e.g., the traffic thereon, and in particular to a road side unit (RSU) as exemplarily road sensor system. In more general, the road sensor system may be a stationary road sensor system, e.g., which a RSU may implement. As other example, the road sensor system may be a mobile road sensor system, e.g., which a vehicle, e.g., an autonomous vehicle, may implement. The references made herein to a RSU may apply in analogy to the vehicle, e.g., the autonomous vehicle, or any other type of road sensor system.

The term "proximity" or "proximate" with reference to a spatial location (e.g., distance) of two or more entities (e.g., RSU) may include that the two or more entities are within an spatial sphere having a diameter of less than a threshold. Examples of the threshold may include: the range of a sensing technology used by the entities; the range of a wireless communication standard used by the entities; 1000 meters or less, e.g., 500 meters or less, e.g., 100 meters or less, e.g., 50 meters or less, e.g., 10 meters or less.

The term "resource information" may include any type of information about one or more resources, examples of which including their type, their usage (herein also referred to as workload), their capacity, their performance, and/or their architecture. Examples of the one or more resources may include one or more data-processing resources (e.g., storing and/or computing), one or more communication resources, service resources, and/or one or more sensing resources. Examples of service resources may include any type of information about one or more provided services, examples of which including specific task executions, visual recognition, controlling services, machine learning (herein also referred to as training), data routing, task management, monitoring, group management, resource management, and the like. For example, the resource information may include resource information being based on a measurement and/or resource information being based on computing (e.g., an estimation or prediction).

The term "offloading" (or "offload") refers to changing the component providing a given service, e.g., changing the component executing a given task processing given data. Changing the place of data-processing (computing) may occur among two processors within the same road sensing system (e.g., within the same road side unit or the same vehicle), two processors of different road sensing system, two processors of different subsystem, and the like. The term "workload orchestration" (also referred to as orchestration) refers to the process of offloading, which is based on the resource information and/or based on thermal output information. Offloading may include to change the distribution of task execution within a group, within the same road sensing system (e.g., within the same road side unit or the same vehicle), within a subsystem or the like. A "orchestrator" may refer to any component implementing one or more services related to the workload orchestration, e.g., implementing the workload orchestration. Micro-services are services causing a workload below a predefined threshold.

The term "historical information" (herein also referred to as historical system information or as log) may include any type of information related to a system (e.g., being sensed, recorded and/or stored by the system). Examples of the historical information include workload measurements, resource information, power strategy, time of recording, time of storage, time of being updated, thermal output information, environmental information, traffic information, group information, performance measurements, and the like.

The term "thermal output information" may include type of information about a thermal output, examples of the which include the total output, the spatial distribution of the thermal output, the time dependence of the thermal output, source of the thermal output, and the like.

The term "workload" may include type of information about the usage of resources (e.g., of a system, subsystem or its components), examples of the which include throughput, number of processed, accepted or outstanding requests, number of processed, accepted or outstanding tasks, latency (delay), throttling, quality of service, response time, deterioration of the operation quality (or difference between the current operation quality and the operation quality target), goodput, number of applications running, and the like.

The term "operation quality" refers to a measure of the performance of the operation, examples of which include: providing one or more services, data-processing (e.g., storing and/or computing), communication, sensing, task execution, and the like. An "operation quality target" (also referred to as quality criterion) refers to any criterion for a certain operation, which is used to rate the operation quality of the operation. Examples of the operation quality target may include a communication quality target, a computing quality target, and/or a sensing quality target.

Figure 1:
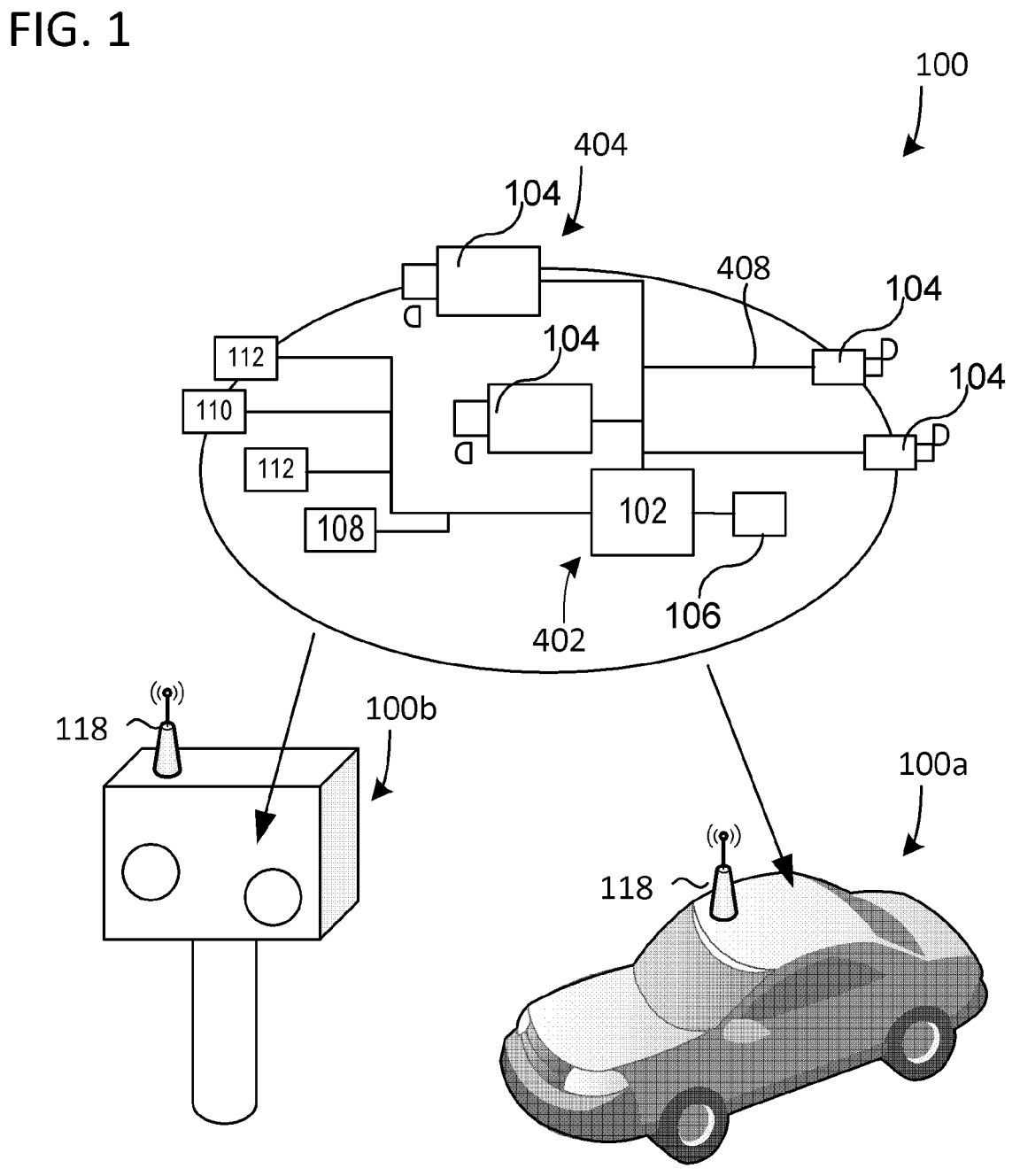

FIG. 1 shows an exemplary road sensor system (RSS) 100, e.g., which a RSU 100*a* or a vehicle 100*b* implements, in accordance with various aspects of the present disclosure. The RSS 100 may include various subsystems, e.g., communicatively coupled to each other, e.g., by a system-intern data interface 408 of the RSS 100. Examples of subsystems of the RSS 100 may include: a data-processing subsystem 402, a sensor subsystem 404, and/or a communication subsystem 406 (see also FIG. 2). Examples of subsystems of the RSS 100 (e.g., in case of a vehicle) may further include a propulsion subsystem, including one or more propulsion devices (e.g., including an electrical or combustion engine) and/or including an energy storage (e.g., fuel tank and/or battery).

The data-processing subsystem 402 may be configured to process data, e.g., to store and/or compute data. The data-processing subsystem 402 may include a processor subsystem (including one or more processors 102) and/or a memory subsystem (including one or more memories 202), e.g., communicatively coupled to each other, e.g., by the system-intern data interface 408. The one or more memories 202 may optionally include (e.g., stored thereon) code segments. Examples of the code segments may include one or more databases 204, one or more models 252, executable instructions, e.g., provided as software (e.g., firmware, middleware, applications), a plurality 254 of power saving levels (also referred to as PSL-set 254), one or more plurality 256 of power saving modes (also referred to as PSM-set 256) and the like. For example, the RSS 100 may store, per subsystem of the RSS 100, a PSM-set 256 assigned to the subsystem.

The communication subsystem 406 may be configured for various communication operations, e.g., including sending or receiving a message, and the like, with a system-extern device. The communication subsystem may be configured to communicate (e.g., generate, send and/or receive messages) in accordance with a network communication protocol, e.g., with the system-extern device. Exemplary components of a communication device may include one or more (e.g., wireless and/or wired) transceivers 208, 210, 212; one or more antennas 118 (also referred to as antenna system); one or more amplifiers, one or more filters, one or more modulators, one or more demodulators, one or more baseband-processors, one or more signal processors, one or more memories, and the like. The communication subsystem may be configured to send the one or more messages in accordance with a (e.g., wireless and/or wired) communication protocol. Analogously, the communication subsystem 406 may be configured to receive one or more messages in accordance with a (e.g., wireless and/or wired) communication protocol and provide the received one or more messages to the data-processing subsystem 402.

The wireless transceivers 208, 210, 212 may, in some aspects, be configured according to the same, different, or any combination thereof, radio communication protocols or standards. By way of example, a wireless transceiver (e.g., a first wireless transceiver 208) may be configured in accordance with a Short Range mobile radio communication standard (e.g., Bluetooth, Zigbee, among others). As another example, a wireless transceiver (e.g., a second wireless transceiver 210) may be configured in accordance with a Medium or Wide Range mobile radio communication standard (e.g., 3G (e.g. Universal Mobile Telecommunications System—UMTS), 4G (e.g. Long Term Evolution—LTE), and/or 5G mobile radio communication standard in accordance with corresponding 3GPP (3$^{rd}$ Generation Partnership Project) standards, among others). As a further example, a wireless transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more wireless transceivers 208, 210, 212 may be configured to transmit signals via antenna system ### over an air interface.

The sensor subsystem 404 may be configured to sense the physical world (also referred to as physical world sensing), e.g., the state of an environment of the RSS 100 and/or a state of the RSS 100 (e.g., of one or more components of the RSS 100). The sensor subsystem 404 may include one or more sensors 104, 106, 108, 110, 112. A sensor (also referred to as detector) may be understood as a transducer that is configured to qualitatively or quantitatively sense a property of its environment (also referred to as environmental property) corresponding to the sensor type, e.g., a geometric, kinematic, mechanical, radiometric (e.g., photometric), thermodynamically, electrical and/or chemical property. The sensed quantity is the physical quantity, to which a sensing process using the sensor is directed. Depending on the complexity of the sensor's environment to be sensed, the sensor may be configured to distinguish only between two states of the sensed quantity or to distinguish between more than two states of the sensed quantity. A sensor may be part of a specific processing chain (also referred to as sensing chain), which includes a corresponding infrastructure (e.g., including processor, storage medium and/or bus system or the like).

The sensing chain may be configured to operate the corresponding sensor (e.g., water sensor, pressure sensor and/or actuation sensor), to process its sensed quantity as input and to provide a target information as output, which represents the input. According to various aspects, the data-processing subsystem 402 (e.g., being components of a controller) may be configured to implement at least a part of the sensing chain. It is noted that the sensing chain may optionally include (e.g., wireless and/or wired) data exchange, e.g., between various nodes of a network based sensing chain. For example, the sensing chain may be configured to output the sensing result via an electrical signal (also referred to as sensor signal) or communicate the sensing result (e.g., wirelessly and/or via wire) to another component of the sensing chain or to a system extern device (e.g., of a RSS).

Generally, each sensor may be configured to sense an actual condition (also referred to as actual state), e.g., the condition at the point of time of the sensing process. Examples of the one or more sensors may be configured to sense the actual condition of the RSS 100 (also referred to as operational condition), wherein other examples of the one or more sensors may be configured to sense the actual condition of the environment of the RSS 100 (also referred to as environmental condition), e.g., to which the one or more sensors are exposed.

Examples of the one or more sensors include one or more optoelectronic sensors 104 (e.g., providing one or more image acquisition devices), one or more distance sensors 110, 112, e.g., one or more radar sensors 110 and/or one or more LIDAR sensors 112, one or more temperature sensors, one or more force sensors 112. Further examples of the one or more sensors (e.g., in the case of a mobile RSS) may include one or more position sensors 106, one or more speed sensors 108 (e.g., in the case of a mobile RSS).

Examples for the more position sensors 106 may be configured to communicate with a navigation system (NS), examples of which include a space-based navigation system (e.g., for determining position using satellites), e.g., a global navigation satellite system (GNSS). The space-based navigation system may include or be formed from, for example, a Global Positioning System (GPS), a Global Navigation Satellite System (GLONASS), a European Global Navigation Satellite System (Galileo), or a Chinese Global Navigation Satellite System (Beidou), among others.

FIG. 2 shows an exemplary system infrastructure 200 of a RSS 100 in accordance with various aspects of the present disclosure. In some aspects, the system infrastructure 200 may include the one or more processors 102 and the one or more sensors, e.g. one or more cameras 104, and/or one or more LIDAR sensors 112. Optionally, the system infrastructure 200 may include one or more user interfaces 206 (e.g., a display, a touch screen, a microphone, a loudspeaker, one or more buttons and/or switches, etc.).

In some aspects, the one or more processors 102 may include an application processor 214, an image processor 216, a communication processor 218, and/or any other suitable processing device. Image acquisition device(s) 104 may include any number of image acquisition devices and components depending on the requirements of a particular application. Image acquisition devices 104 may include one or more image capture devices (e.g., cameras, CCDs (charge coupling devices), or any other type of image sensor).

In at least one aspect, the system infrastructure 200 may also include a data interface 408 communicatively connecting the one or more processors 102 to the one or more image acquisition devices 104. For example, the data interface 408 may include one or more (e.g., wired and/or wireless) first links 220 configured to transmit image data, which the one or more image acquisition devices 104 acquire, to the one or more processors 102 (e.g., to the image processor 216).

The wireless transceivers 208, 210, 212 may, in some aspects, be coupled to the one or more processors 102 (e.g., to the communication processor 218) via, for example the data interface 408. The data interface 408 may include one or more (wired and/or wireless) second links 222 configured to transmit radio transmitted data acquired by wireless transceivers 208, 210, 212 to the one or more processors 102, e.g., to the communication processor 218.

In some aspects, the memories 202 as well as the one or more user interfaces 206 may be coupled to each of the one or more processors 102, e.g., via the data interface 408. The data interface 408 may include one or more (e.g., wired and/or wireless) third link 224. Furthermore, the position sensor 106 may be coupled to each of the one or more processors 102, e.g., via the data interface 408.

Such transmissions may also include communications (e.g., one-way or two-way) between the RSS 100 and one or more other RSS 100 in an environment of the vehicle RSS 100 (e.g., to facilitate collaboration, or even a broadcast transmission to unspecified recipients in a vicinity of the RSS 100).

One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and other protocols as communication protocols.

Each processor 214, 216, 218 of the one or more processors 102 may include various types of hardware-based processing devices. By way of example, each processor 214, 216, 218 may include a microprocessor, pre-processors (such as an image pre-processor), graphics processors (e.g., GPU, iGPU or dGPU), a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with executable instructions, which a memory of the one or more memories 202 stores. For example, a memory of the one or more memories 202 may store software that, when executed by a processor (e.g., by the one or more processors 102), controls the operation of the system, e.g., the safety system. A memory of the one or more memories 202 may store one or more databases and image processing software, as well as a trained model, such as a neural network, or a deep neural network (DNN), for example. The one or more memories 202 may include any number of random access memories, read only memories, flash memories, disk drives, optical storage, tape storage, removable storage and other types of storage.

In some aspects, the sensor subsystem 404 of system infrastructure 200 may further include components such as an ultrasonic sensor, a thermal sensor, one or more radar sensors 110, one or more LIDAR sensors 112 (which may be integrated in the head lamps of the vehicle 100*b*), and the like. The radar sensors 110 and/or the LIDAR sensors 112 may be configured to provide pre-processed sensor data, such as radar target lists or LIDAR target lists. The data interface 408 may couple the speed sensor 108, the one or more radar sensors 110 and the one or more LIDAR sensors 112 to at least one of the one or more processors 102.

In case of a vehicle 100*b*, the one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the RSS 100 together with position information, such as a GPS coordinate, a vehicle's 100*b* ego-motion, etc., to determine a current location of the vehicle 100*b* relative to the known landmarks, and refine the determination of the vehicle's location. Certain aspects of this technology may be included in a localization technology such as a mapping and routing model.

In case of a vehicle 100*b*, the system infrastructure 200 may include a driving model, e.g., implemented in an advanced driving assistance system (ADAS) and/or a driving assistance and automated driving system. By way of example, the system infrastructure 200 may include (e.g., as part of the driving model) a computer implementation of a formal model such as a safety driving model. A safety driving model may be or include a mathematical model formalizing an interpretation of applicable laws, standards, policies, etc. that are applicable to self-driving (ground) vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it may be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents may be avoided.

Figure 3:
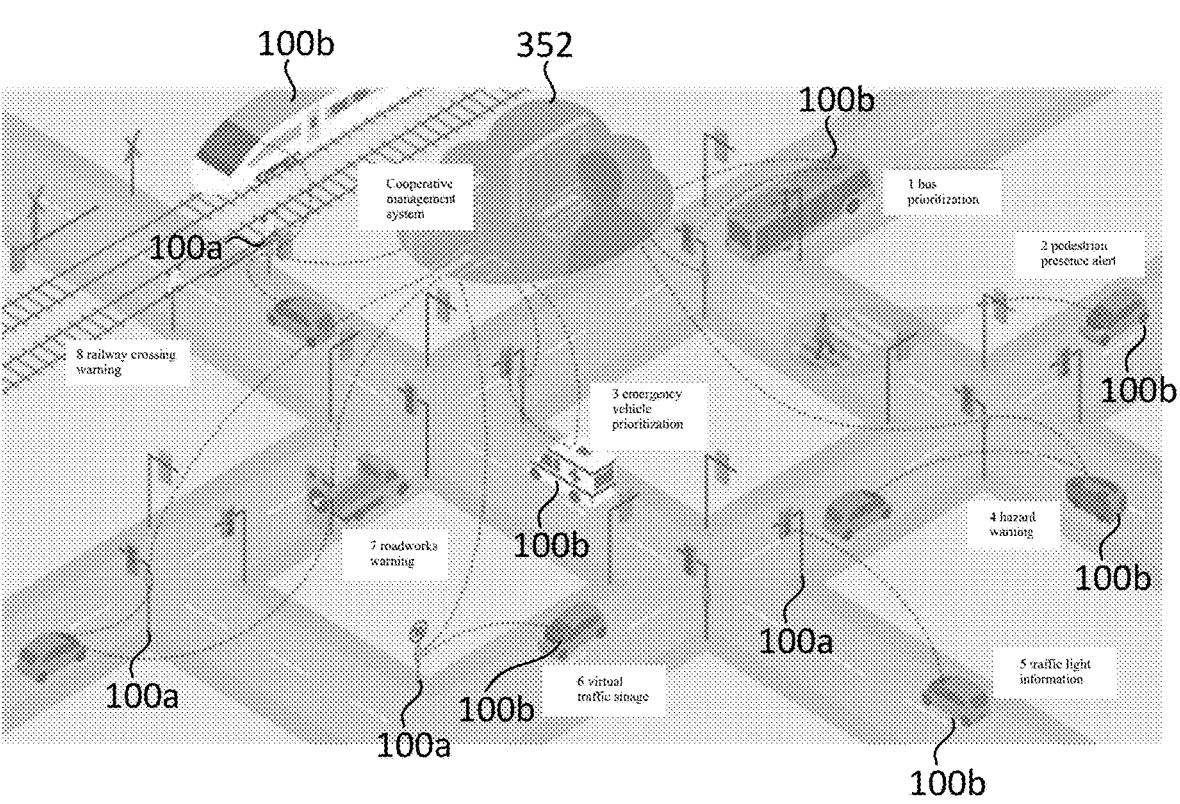
FIG. 3 shows an exemplary topology including one or more RSS in accordance with various aspects of the present disclosure.

FIG. 3 shows an exemplary topology 300 including one or more RSS 100 in accordance with various aspects of the present disclosure, such as RSUs 100*a* and vehicles 100*b*. The topology 300 may be, for example, a topology of RSU Edge Infrastructure in a Smart City.

In future smart road network and smart cities, a large number of RSUs and related infrastructures may be deployed on the road infrastructure to provide always available support for sensing, data processing (e.g., computation) and/or communication. Since these RSUs 100*a* will be equipped with several sensors (e.g., Camera, Lidar, Radar, etc.) and data processing (e.g., compute/edge) capabilities to sense the physical world in near real-time, they will be consuming significant electrical power. Moreover, these RSUs 100*a* need to communicate with other RSUs 100*a*, a cloud or operator 352, and vehicles 100*b* on the road, thus requiring one or more communication protocol stacks and radio access technologies (RATs) running on them. Sensing, data-processing and communication operations consume power. During busy hour, most of these operations may be provided by all RSUs 100*a*, e.g., in accordance with a operation quality target.

However, road usage changes over time of the day (busy vs non-busy hours) or based on specific events in a region. During non-busy hours, RSUs 100*a* operations may be intelligently optimized to minimize power consumption. Hence, a power saving strategy to ensure sustainable power consumption is beneficial for millions of RSUs 100*a* expected to be deployed in future smart road network and smart city. Similarly, in future smart road network and smart cities, autonomous vehicles (AVs) 100*b* may perform operations like sensing, sensor data processing and communication to share sensing, which involve huge amount of power consumption. One or more AVs 100*b* may be configured to optimize device power consumption by intelligently reducing sensing, processing and communication operations in accordance with a power saving strategy.

The power saving strategy, applied to an individual RSS (e.g., RSU 100*a*), may cause (e.g., instruct) the RSS to reduce its power consumption by one or more of the following operations:

(i) sensing power optimization may include deactivating (e.g., shutting down) or activating (e.g., running) one or more (e.g., selected or all) sensors, e.g., at low-power mode, like provided by a reduced sensing rate, e.g., when the one or more sensors are not needed;

(ii) data-processing (e.g., computing) power optimization may include deactivating (e.g., moving to idle or sleep mode) one or more (e.g., selected or all) cores or activating (e.g., running) one or more (e.g., selected or all) CPUs, e.g., at lower frequency; and/or workload orchestration across heterogeneous processors (CPU, iGPU, VPU/HDDL, FPGA/HDDL, dGPU), etc.; and (iii) communication (e.g., protocol stack) operation optimization may include deactivating (e.g., moving to idle or sleep mode) one or more radios and/or one or more modems of the communication subsystem 406, e.g., with or without (e.g., periodic) activation schedule.

The inference engine HDDL is configured for inference of neural networks on some VPUs, which may be configured for use cases requiring large throughput of deep learning inference.

Conventionally, RSU power saving is highly specific the current case and the full potential of RSU power saving is not exploited. Such conventional approaches include either compute-specific or communication-specific power optimization techniques but do not consider joint optimization for compute, communication, and sensing operations. Due to the lack of joint considerations, conventional approaches result in suboptimal power saving and lead the entire system to undesired state, especially when individual power savings conflicts with each other.

According to various aspects of this disclosure, the power saving strategy provides a situation-specific combination of the power saving schemes (also referred to as PSMs), e.g., while jointly considering dynamic but heterogeneous (e.g., sensing, computing, and/or communication) workload at the RSU 100*a*. In this regard, the system infrastructure 200 of a RSS 100 may include one or more components as described later and implementations to optimize the power saving at an individual RSU 100*a*, while maintaining required QoE (Quality of Experience) for the smart transportation application.

The same approach may be applied one or more vehicles 100*b* to maximize the power saving of the vehicles 100*b*, e.g., by (i) shutting down or running one or more (e.g., selected or all) sensors, e.g., at low-power mode, like reduced sensing rate or reduced precision mode (such as in case of sparse traffic with less probability of sudden change in environment like in rural road, late night), etc.;

(ii) moving one or more (e.g., selected or all) cores to Idle, running one or more (e.g., selected or all) CPUs at lower frequency, etc.; and (iii) moving radio and/or modem in Idle or Sleep mode, e.g., with/without (e.g., periodic) activation schedule.

According to various aspects, a collaboration among proximity RSS 100 (e.g., RSUs 100*a* and/or vehicles 100*b*) provides further opportunity to enhance overall power consumption by forming of a group of RSS 100 (also referred to as PSG). According to various aspects, it is provided to dynamically form a collaborative group of RSS 100 based on context information (e.g., about environment, traffic dynamics, compute and/or sensing workload within a geo-area etc.) and leverage the redundant resources (such as sensing and/or computing resources) in the PSG to reduce the aggregated power consumption of the PSG. In this regard, functions to form a PSG (also referred to as power saving group) are provided, e.g., at facility layer and/or middleware, among proximity RSS 100, e.g., in case of dense RSU deployment. The RSS 100 in a PSG may be configured to transmit resources information and/or demand information (e.g., about CPU, accelerators, Smart-NICS, storage, communication and/or data-processing demands) in order to jointly optimize sensing, data-processing (e.g., computing) and communication operations to enhance the group power saving. As such, one or more vehicles 100*b* and/or one or more RSU 100*a* may form a PSG, e.g., with/without edges/RSUs, to cooperatively optimize the sensing tasks, data-processing resources and/or workloads, and communication operations to enhance overall group device power saving.

According to various aspects, a controller and methods thereof provide functions, as detailed herein, to maximize RSS 100 power saving. Herein, reference will be made to RSU 100*a* (as exemplarily RSS 100) implementing the controller and methods, e.g., from the perspective of the RSU 100*a* (herein also referred to as RSU-A). The references made to specific components, e.g., controller, the RSU 100*a*, modules, vehicle 100*b*, a PSG, e.g., regarding the provided functions, may apply analogously to a whole PSG (e.g., commonly implementing the controller and methods), one or more vehicles 100*b*, one or more RSUs 100*a*, e.g., their controller. For example, the controller and methods may be applicable to maximize the power saving of a vehicle.

Figure 4:
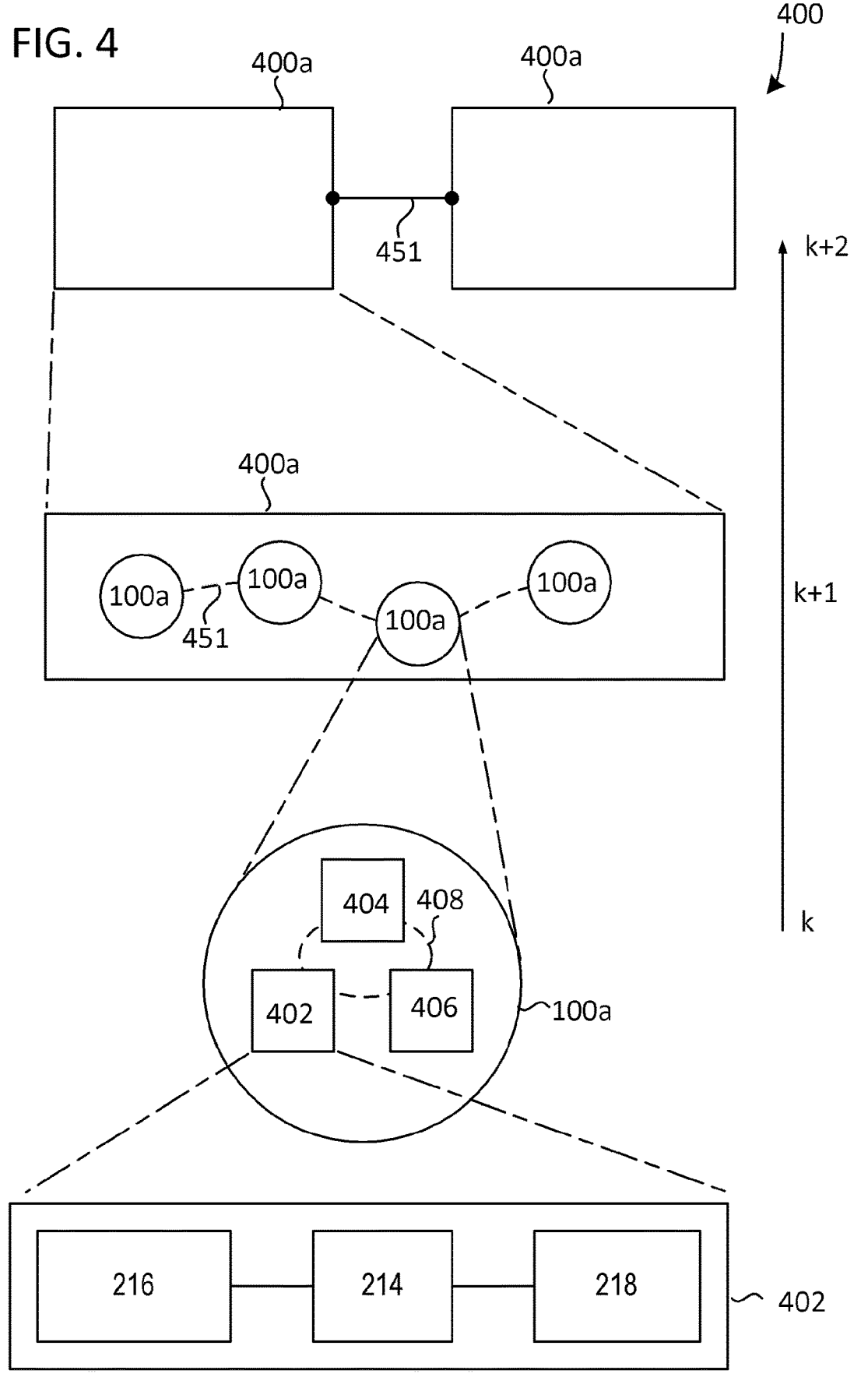
FIG. 4 shows a system architecture in accordance with various aspects of the present disclosure.

FIG. 4 shows a system architecture 400 in accordance with various aspects of the present disclosure. On the k-th system level (also referred to as device level), the RSS 100 may be understood as single device (e.g., RSU 100*a* or vehicle 100*b*) including multiple circuits 402, 404, 406 as subsystems. On the next higher (k+1)-th system level (also referred to as area level), a RSS 100 may be understood as PSG 400*a* (including multiple network-connected 451 RSU 100*a* as member of the PSG 400*a*) and each member as subsystem. On the next higher (k+2)-th system level, the RSS 100 may be understood as multiple network connected PSG 400*a*. On a system level lower than the device level (also referred to as integration level), the data-processing subsystem 402 may be understood as system including one or more communicatively connected processors 216, 214, 218 as components.

As understood herein, the RSS 100 detailed herein may be understood as RSU 100*a*, as PSG 400*a*, as multiple network connected PSG 400*a*, and the like.

Figure 5:
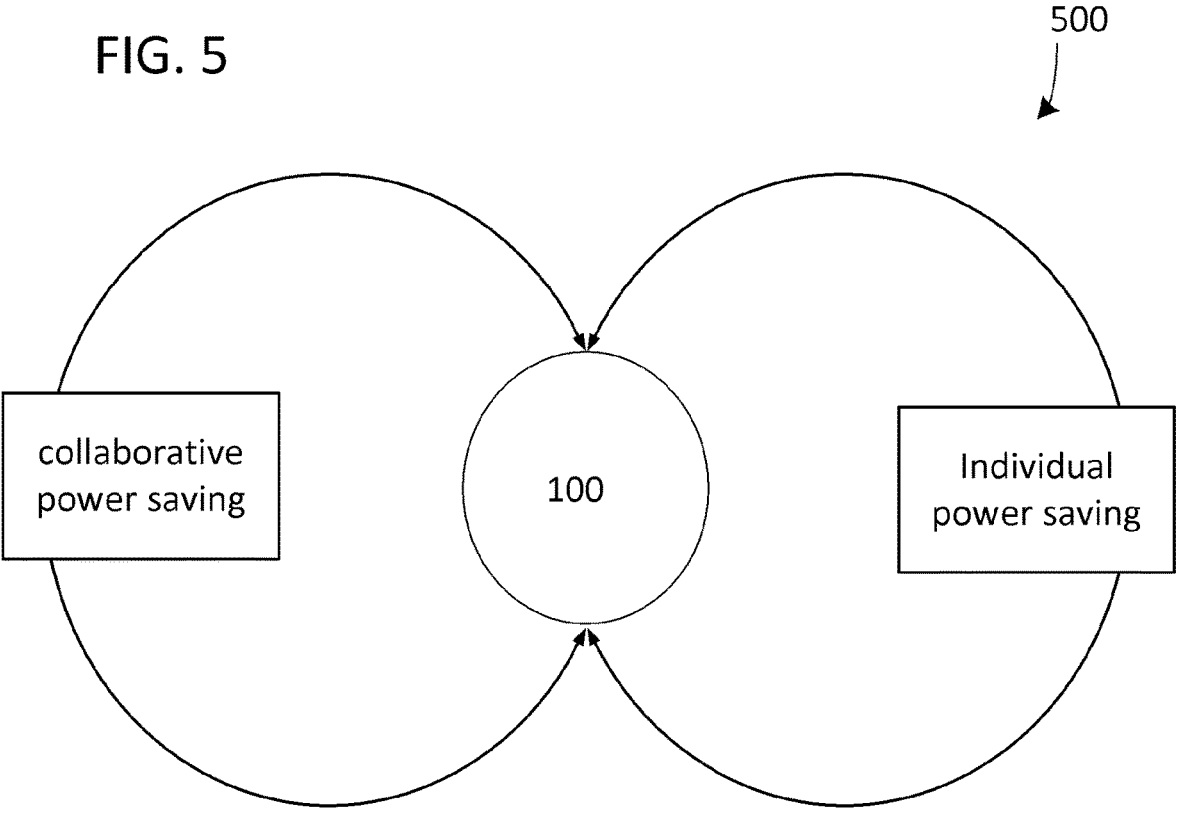
FIG. 5 shows a RSS in operation in accordance with various aspects of the present disclosure.

FIG. 5 shows a RSS 100 in operation 500 in accordance with various aspects of the present disclosure. The references made to the RSS 100 and its functions may apply analogously to a controller (e.g., a processor thereof), e.g., being part of the RSS 100.

In a first operation mode (herein also referred to as self-optimization), the RSS 100 may be configured to minimize the power consumption within the borders of its own system level (also referred to as individual power saving). In a second operation mode (herein also referred to as group-optimization), the RSS 100 may be configured to minimize the power consumption in collaboration with one or more other RSS 100, e.g., within the borders a system level higher than its own system level (also referred to as group power saving).

Said more generally, the RSS 100 may be configured to determine the PSS: for the RSS 100 (also referred to as internal PSS determination) in a first operation mode; and for one or more members of the PSG (also referred to as external PSS determination) in a second operation mode.

In general, minimizing the power consumption may be based on a power saving strategy (PSS), e.g., using a power saving model to determine the PSS (generally referred to as PSS determination). The PSS may include one or more components. For example, the PSS may include a power saving target (PST) for the RSS 100 as component. Additionally or alternatively, the power saving strategy may include a power saving mode (also referred to as power saving scheme or as PSM) for each subsystem of the RSS 100 as component.

In an exemplarily implementation, the RSS 100 may be configured to determine the PST, by selecting a power saving level from the plurality 254 of power saving levels (also referred to as PSL-set 254) as determined PST. Additionally or alternatively, the RSS 100 may be configured to determine the PSM for each subsystem, for example, by selecting a power saving mode from the plurality 256 of power saving modes (also referred to as PSM-set 256) assigned to the subsystem. The resulting multiple PSMs as determined for the multiple subsystems may be also referred to as combination of power saving schemes.

Figure 6:
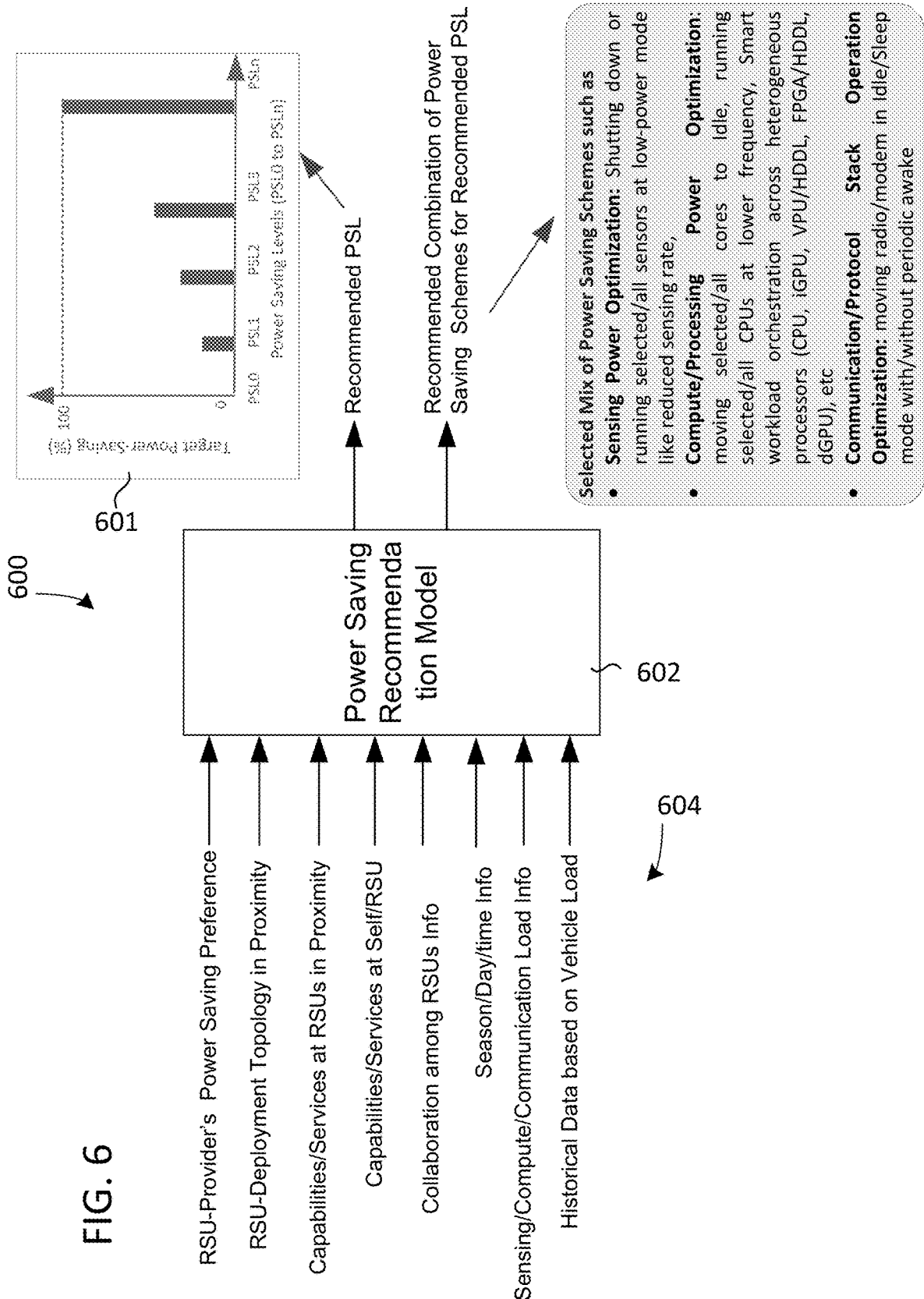
FIG. 6 shows an exemplary PSS determination in accordance with various aspects of the present disclosure.

FIG. 6 shows an exemplary PSS determination 600 in accordance with various aspects of the present disclosure. The controller, e.g., its one or more processors, may be configured to perform the PSS determination 600 based on a power saving model 602 (also referred to as power saving recommendation model). For example, the controller may implement the power saving model 602.

According to various aspects, the architecture 600 of the power saving model 602 may be based on a reinforcement learning (RL)-based framework with DNN-based classification algorithm, as detailed later.

The power saving model 602 may be configured to output the PST, e.g., by selecting a PSL from the PSL-set 254 as PST. The PSL-set 254 may include multiple PSL, e.g., ranging from PSL0 to PSLn, of which the selected PSL may be configured as a PST assigned (e.g., proposed to) an RSS 100, e.g., for a RSU 100*a*.

Additionally or alternatively, the power saving model 602 may be configured to output a PSM, e.g., by a selecting the PSM from the PSM-set 256. The PSM-set 256 may include multiple PSM, as detailed later.

The controller, e.g., its one or more processors, may be configured to supply context information as input 604 to the power saving model 602 (also referred to as model input data 604). For example, the power saving model 602 may be configured to output the PST and/or one or more PSM based on the model input data 604. For example, the context information may be fed as model input data 604 to the power saving model, which provides a recommendation for the PSL to be set as PST, e.g., for a target RSU 100*a*.

In an exemplarily implementation, the power saving model 602 may include or may be a AI (e.g., ML)-based algorithm. The power saving model 602 may be configured to (e.g., dynamically or semi-statically) select one PSL for an RSU subject to maintaining operation quality targets, e.g., target QoS (Quality of service), for smart transportation systems.

Illustratively, reducing the RSU power consumption (e.g., by intelligently) may include reducing power consumptions for one or more of: physical world sensing, data-processing (e.g., storing and/or computing data), and communication operations, as detailed later. In the following, various instructions are detailed to reduce power consumption for these operations in accordance with the power saving strategies. A combination of proposed instructions to save power consumption for operations like sensing, data-processing and communication may be applied to reduce power consumption at RSU 100*a* by a known amount or fraction (X) of the available reduction of the power consumption (also referred to as available power reduction) at a determined (e.g., estimated) power consumption of RSU 100*a*. The determination of the power consumption of RSU 100*a* (also referred to as power consumption state) will be explained later.

According to various aspects, the PSL-set 254 may include a finite number of N (N=n+1) discrete PSLi (i=0 . . . N), which are also referred to as PSL0 to PSLn. Each of the PSLi may be configurable as PST for an RSU, e.g., by assigning the selected PSL as PST to the RSU 100*a*. An exemplary implementation of the PSL-set 254 is illustrated in diagram 601.

According to this exemplary implementation, the PSL-set 254 may include the following PSL:

PSL0: the lowest PSL (PSL0) may represent a minimum reduction of the power consumption. For example, the fraction X0 of the power consumption of RSU 100*a* for PSL0 may be 0% of the available power reduction. In other words, power saving is not necessary and/or feasible. Selecting PSL0 as PST may instruct all subsystems of the RSU 100*a* (e.g., data-processing subsystem 402, a sensor subsystem 404, and/or a communication subsystem 406) to operate fully activated or with the operation mode (e.g., power saving mode) as before selecting PSL0 as PST.

PSL1: may represent a power reduction X1>X0, e.g., X1=20%, of the determined available power reduction.

PSL2: may represent a power reduction X2>X1, e.g., X2=40%, of the determined available power reduction.

PSLn—may represent a maximum power reduction Xn>X2, e.g., Xn=100%, of the determined available power reduction.

One or more optional PSLj may represent a maximum power reduction Xi, with Xn>Xj>X2>X1>X0.

Said more generally, two PSLs of the PSL-set 254 may differ from each other in the power reduction X, the PSL indicates. For example, Xi of PLSi may be less then Xj of PLSj, when j<i, e.g., for each pair of (j,i) being 0≤j≤i≤n.

Examples of the model input data 604 (e.g., the context information) may include: operator instructions (e.g., RSU-operator's power saving preference); information about one or more system-extern RSU in spatial proximity (also referred to as system-external RSU-information); information about the RSU (also referred to as system-internal RSU-information); information about one or more PSGs (also referred to as group information); information about time (e.g., workload peak hours, none peak hours, day of the week, current season, current day and/or current time of the day); historical information about the RSU (e.g., applied PST and/or power saving mode(s); operation history; historical resource information; workload history); historical information about the sensed road (e.g., data about the historical vehicle load, historical traffic pattern, and the like); long term demand information (e.g., learned over time).

The system-external RSU-information may include spatial information (e.g., system-external RSU-deployment topology in proximity, geo-area information, position information) and/or resource information (e.g., one or more capabilities and/or one or more services, the one or more system-external RSU provide; and/or one or more resources available at the system-external RSU). The system-internal RSU-information may include spatial information (e.g., position of the RSU) and/or resource information (e.g., one or more capabilities and/or one or more services, the RSU may provide, resources available at the RSU). The group information may indicate one or more PSG available for the RSU 100a (e.g., in proximity of the RSU 100a), available coordination among proximity RSUs; and/or whether the RSU 100a is a member of one or more PSG (e.g., collaboration among RSUs information).

In more general, resource information of a RSU may include information about one or more resources (e.g., about one or more subsystems) of the RSU, e.g., number of processors, sensors and the like. Examples of the resource information may include: information about the architecture (e.g., components) of the one or more subsystems of the RSU; information about the workload (e.g., usage) of the one or more subsystems of the RSU; information about the capability (e.g., services) of the one or more subsystems of the RSU, and the like. For example, the resource information may include information about one or more of the RSU: sensing workload, computing workload and/or communication workload.

As detailed above, the power saving model 602 may be configured to provide one or more PSMs, e.g., one PSM per subsystem of the RSU 100a, which is detailed below. Illustratively, a determined combination of PSMs may facilitate to achieve a PST assigned (e.g., proposed) to the RSU 100a. Each PSM may be assigned to a subsystem of RSU 100a. Additionally or alternatively, the RSU 100a may include (e.g., store) multiple PSM-sets 256, e.g., including one PSM-set 256 per subsystem of the RSU 100a (being assigned to the respective subsystem).

Each PSM-set 256 assigned to a subsystem may include a plurality of PSM, which differ from each other in one or more of the following: an allowable power consumption of the subsystem, a duty cycle (e.g., indicating an activation and/or deactivation schedule) of one or more components of the subsystem, an operation frequency of one or more components of the subsystem (e.g., clock rate, telemetry rate or sensing rate), a number of activated or deactivated (e.g., sleeping or idling) components of the subsystem, an assignment of one or more tasks to one or more components of the subsystem, an activation schedule of one or more tasks to one or more components of the subsystem; a activation period of one or more tasks to one or more components of the subsystem; an allowable workload of the subsystem; an allowable thermal output of the subsystem (e.g., in total and/or its spatial distribution).

Examples of the tasks may include: sensing task, computing task, storing task, communication task.

A deactivated component consumes less power than an activated component. Examples of deactivating a component may include: putting the component to idle mode and/or putting the component to sleep mode. In idle mode, the component is still responsive but is not executing any task (e.g., refusing to execute a task). In sleep mode, the component is shut down, e.g., by turning off the clock as well as all task execution.

For example, changing the PSM of the sensor subsystem 404 may cause (e.g., instruct) one or more of the following: deactivate (e.g., shut down) one or more sensors; activate (e.g., run) one or more sensors (e.g., at low-power mode); change the sensing rate of one or more sensors. The one or more sensors may include a number of selected sensors or all sensors of the sensor subsystem 404. The PSM may indicate the selected sensors, e.g., to be activated, deactivated, etc.

For example, changing the PSM of the data-processing subsystem 402 may cause (e.g., instruct) one or more of the following: deactivate one or more processors 102 (e.g., moving selected or all cores to idle), activate (e.g., running) one or more processors 102, change (e.g., reduce or increase) the frequency one or more processors (also referred to as clock rate); and/or change the assignment (also referred to as offloading or re-assigning) one or more tasks assigned to the data-processing subsystem 402. For example, the offloading may include to supply the one or more tasks to another processor of the data-processing subsystem 402, to another subsystem of the RSU 100a or to another RSU 100a.

As an example, one or more tasks of the data-processing subsystem 402 may be re-assigned to another subsystem of the RSU 100a by offloading the one or more tasks (e.g., micro-services) to low-powered wimpy processors of the communication subsystem 406 (e.g., its Network Interface Controller, e.g., a SmartNIC). Said more generally, the RSU 100a may be configured to change the assignment of one or more tasks from a first subsystem of the PSU 100a to a second subsystem of the PSU 100a (also referred to as "task offload" or shorter "offload"), e.g., based on a first power saving strategy (e.g., PSM) of the first subsystem and/or based on a second power saving strategy (e.g., PSM) of the second subsystem, e.g., based on a difference between the first power saving strategy and the second power saving strategy. Examples of the one or more tasks may include one or more application requests and/or processing one or more service packets.

For example, changing the PSM of the communication subsystem 406 may cause (e.g., instruct) one or more of the following: deactivate (e.g., put to idle or sleep mode) one or more transceivers 102 (e.g., its radio and/or modem), e.g., with or without activation schedule (also referred to as awakening schedule); activate one or more transceivers 102; change the communication rate of the one or more transceivers 102. Deactivating one or more transceivers 102 may include deactivating (e.g., put to idle or sleep mode) the radio of the transceivers 102 or the modem of the transceivers 102, e.g., with/without activation schedule (e.g., periodic awake).

Changing the assignment of a task to one or more components of the subsystem may include a (e.g., smart) workload orchestration across heterogeneous processors (e.g., CPU, iGPU, VPU/HDDL, FPGA/HDDL, dGPU, and the like). Additionally or alternatively, changing the assignment of a task may include re-assigning the task within a subsystem.

In an exemplary implementation, one or more predicted demand information (e.g., including predicted workload or predicted requests) for services along with one or more operation quality target (e.g., quality of service (QoS) requirements) are used along with context information to dynamically or semi-statically determine a power saving level (PSL) for an RSU by one or more intelligent algorithms of an AI (e.g., ML)-based power saving model 602 (e.g., a selection model). The AI (e.g., ML)-based power saving model 602 may be a part of a module (also referred to as Power Saving Recommender and Governor) as detailed later.

In an exemplary implementation, one or more AI (e.g., ML)-based algorithms may provide to intelligently select one or more combinations of the PSM to achieve an target PSL (also referred to as PST) for obtaining closer to optimal reduction of the power consumption than compared to that obtained by using a heuristic-based (e.g., non-ML) algorithm. Moreover, the use of an AI (e.g., ML)-based intelligent algorithm for the selection of the PST may be beneficial, as the amount of training data availability is continuously increasing for each RSS 100 and is evolved over time, thus leading to a more accurate and robust power saving model 602 over time. Details of such power saving model 602 based on a reinforcement learning (RL) framework utilizing one or more ML-based (e.g. DNN) algorithms for selecting PST is described later in detail.

As detailed above, the RSU may be configured to collaborate with one or more (e.g., proximity) RSUs to further enhance overall power consumption e.g., by forming a group of RSUs (also referred to as PSG). Such PSG may be configured to turn off one or more redundant resources (such as sensing and/or data-processing Resources), thus reducing power consumption further.

In an exemplarily implementation, the controller (e.g., implemented by the RSU-A) may be configured to manage a PSG based on a discovery and context awareness protocol (DCAP) as exemplary collaboration protocol. The DCAP may indicate the circumstances, e.g., time, periodicity and/or context, for generating one or more messages (also referred to as discovery and context awareness message or as DCAM) being in accordance with the DCAP. The controller may be configured to transmit the DCAM to one or more (e.g., system-extern) RSUs (e.g., being in the proximity to the RSU-A). Alternatively or additionally, the controller may be configured to receive the DCAM from one or more (e.g., system-extern) RSUs (e.g., being in the proximity to the RSU-A).

DCAP configures the controller to determine the communication topology among one or more RSUs (e.g., in proximity to the RSU-A) and other resources (e.g., sensing and/or data processing and/or communication resources), e.g., capabilities (e.g., sensing and/or data processing and/or communication capabilities) provided by the one or more RSUs.

According to various aspects, the DCAP may include a group management protocol for forming a PSG. The DCAP, e.g., the group management protocol, may be implemented in a facility layer or middleware of each RSU, e.g., in case of a dense RSU deployment. For example, each RSU being member of a PSG may be configured to include into the DCAM one or more of the following information: resource information, demand information (such as demand for CPU, accelerators, Smart-NICS, storage, communication and/or computing). This facilitates the management of one or more of the following operations: sensing operation, computing operation, data-processing operation, and communication operation within the borders of the PSG, e.g., as part of the resource management. This facilitates to enhance the group power saving.

Optionally, a PSG may include a leader being a member of the PSG. The leader may be configured to coordinate the resource management and/or to determine a group power saving strategy (e.g., PST per member and/or one or more PSM per member). For example, the group power saving strategy (GSPS) may include, for each member of the PSG, a power saving strategy of the member.

Figure 7:
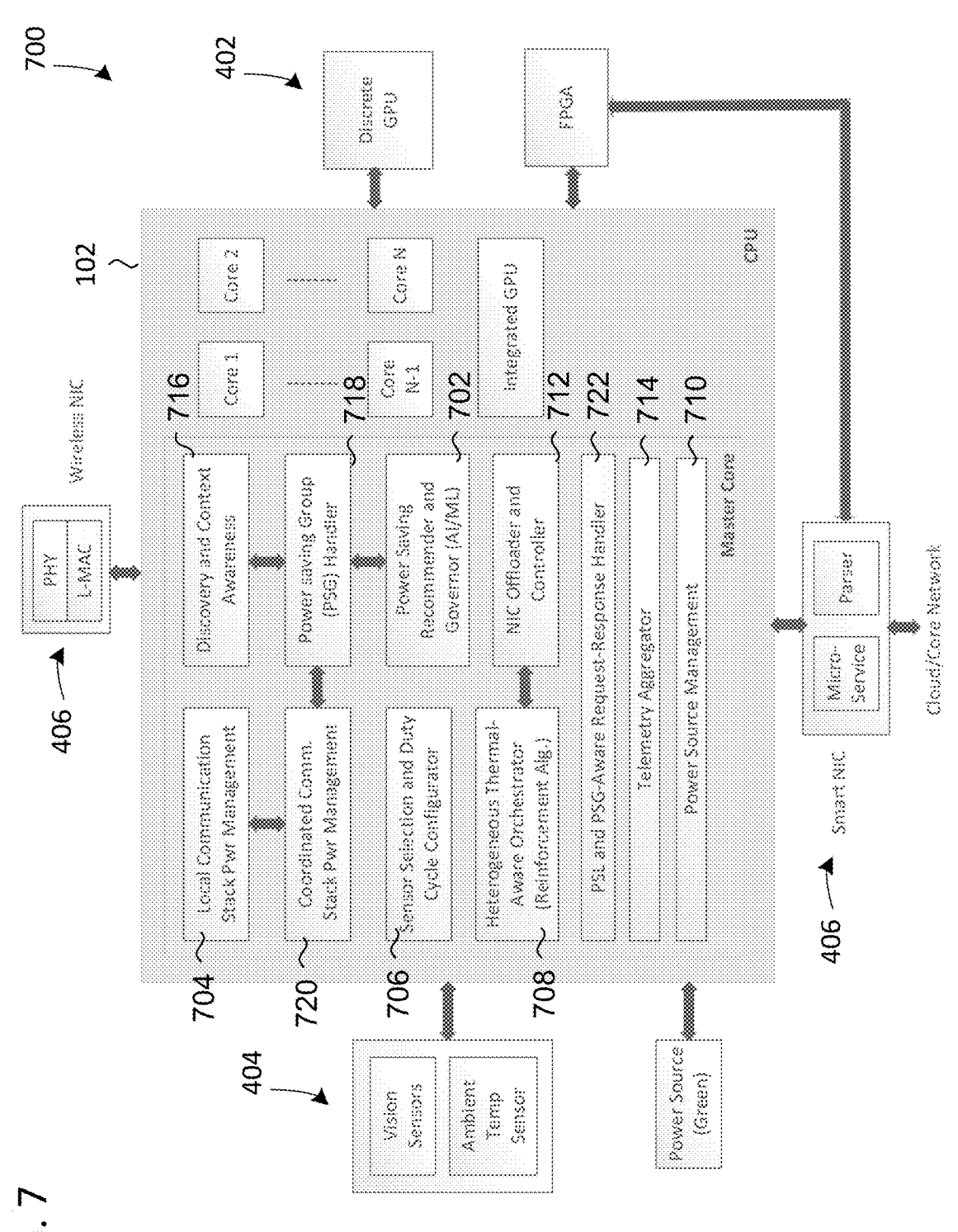
FIG. 7 shows an exemplary system architecture of a RSU in accordance with various aspects of the present disclosure.

FIG. 7 shows an exemplary system architecture 700 of a RSU 100a in accordance with various aspects of the present disclosure (also referred to as RSU power savings architecture 700). The system architecture 700 includes multiple modules for implementing the above mentioned functions. The illustrated modules may represent (e.g., physical and/or data-based) components of the RSU 100a, e.g., being implemented by one or more subsystems of the RSU and/or by the controller. It may be understood that the functions of two or more modules may be integrated into a single module and vice versa. As such, the RSU 100a (or the controller) may include one or more of the following modules:

A first module 702 (also referred to as Power Saving Recommender and Governor) may be configured to determine (e.g., recommend) a PSL as PST based on context information and/or to determine one or more PSM based on the PST (e.g., to achieve the recommended PSL or the PST).

A second module 704 (also referred to as Local Communication Stack Power Management) may be configured to determine (e.g., predict) demand information, e.g., including one or more demands, for the communication subsystem 406, e.g., based on one or more operation quality targets (e.g., QoS requirements) and/or based on one or more traffic information (e.g., traffic pattern). Examples of the traffic information include information about the sensed road, information about the vehicle load, traffic pattern, and the like. Examples of traffic pattern include: periodic traffic pattern, sparse traffic pattern, and the like. Examples of the operation quality targets (e.g., QoS requirements) include: real-time requirement, delay-tolerance requirement, and the like. The one or more demands for communication may be used to dynamically or semi-statically select one or more duty cycles (e.g., optimal period of sleep cycles) for the communication subsystem 406, e.g., its wireless network interface.

A third module 706 (also referred to as Sensor Selection and Duty Cycle Configurator) may be configured to determine one or more sensors (of the sensor subsystem 404) as selected sensor(s) and a duty cycle for the selected sensor(s) based on the context information and/or the demand information.

A fourth module 708 (also referred to as Heterogeneous Thermal-aware Orchestrator) may be configured to determine (e.g., estimate), e.g., using a computing orchestrator (e.g., Kubernetes), thermal output information about one or more subsystems of the RSU 100a, e.g., based on the resource information (e.g., the current computing workload). Examples of the thermal output information include: a thermal output of the subsystem; and/or a spatial distribution of the thermal output of the subsystem. Illustratively, the fourth module 708 incorporates thermal awareness into the computing orchestrator. In an exemplary implementation, the fourth module may include a model of a thermal output (also referred to as thermal output model) of the RSU 100a. As an example, the thermal output model uses a reinforcement learning algorithm to learn, which component (kernel and/or layers) contributes to which level of the thermal output or to which spatial distribution of the thermal output. The computing orchestrator may be configured to provide (e.g., indicate or determine) an assignment of one or more data-processing tasks (e.g., the current workload) across the data-processing subsystem 402a (e.g., across its heterogeneous computing resources) of the RSU 100a, e.g., based on the sensed ambient temperature, to which the RSU 100a is exposed.

A fifth module 710 (also referred to as Power Source Management) may be configured determine, whether the usage of green power (e.g., solar and/or wind power) is available and/or to prioritize the usage of green power. When the RSU 100a uses green power (and optionally grid power as backup), it may (e.g., periodically) inform the Power Saving Recommender and Governor module about the usage of green power, so that the RSU 100a using green power increases in priority to remain active in a PSG, while determining (e.g., negotiating) a power saving strategy within the PSG (also referred to as group power saving strategy or as GPSS).

A sixth module 712 (also referred to as MC Offloader and Controller) may be configured to determine the resource and/or performance demands of micro-services, and to select their place of execution (e.g., CPU, core or Network Interface Controller, e.g., SmartNIC) among the subsystems of the RSU 100a, e.g., dynamically. The sixth module 712 may be optionally configured to, based on this selection, install one or more packet parsing rules into the place of execution (e.g., on-NIC storage), such that incoming packets may be supplied to locally executed micro-services instead of being supplied to the data-processing subsystem 402 (e.g., its CPU cores).

A seventh module 714 (also referred to as Telemetry Aggregator) may be configured to determine telemetry information and/or system-internal RSU-information from one or more modules of the RSU 100a (examples of which including the current combination of workload, the thermal output information, the power consumption from heterogeneous computing, power usage by the active sensors, etc.). Optionally, this telemetry information and/or system-internal RSU-information may be supplied to the controller (or edge) to train one or more (e.g., AI (e.g., ML)) models used to determine the power saving strategy (e.g., PSL and appropriate combination of PSM) for the actual workload.

The above modules and functions may be configured to implement the self-optimization of the RSU 100a. In the following, modules and functions are disclosed for the implementation of a PSG (e.g., the collaborative resource management and/or group power saving strategy) and/or the group-optimization.

A eight module 716 (also referred to as Discovery and Context Awareness (DCA)) may be configured to manage the operation of the RSU in accordance with the DCAP, which may be continuously running at a facility layer and/or middleware of the RSU 100a (or controller), as example. According to the DCAP, the RSU-A 100a may be configured to (e.g., periodically) transmit a DCAM to one or more other RSUs, e.g., in the proximity to the RSU-A 100a. An exemplary DCAM is provided later in detail.

A ninth module 718 (also referred to as Power Saving Group (PSG) Handler) may be configured to (e.g., continuously) determine the need for forming or attending a PSG, e.g., to initiate the formation of a PSG. Whenever coordination among RSUs is needed for power saving, the PSG handler may initiate forming or attending a PSG. Once the PSG group is formed, the ninth module 718 may be configured to manage the role of RSU 100a, e.g., as either regular member or leader of the PSG.

A tenth module 720 (also referred to as Coordinated Communication Stack Power Management) may be configured to determine a duty cycle (e.g., sleep schedule, sleep periodicity, sleep start time and/or sleep duration) of one or more radios of the communication subsystem 406 and apply the duty cycle to the one or more radios. The determination of the duty cycle may be based on the output of the Power Saving Recommender and Governor and/or the output of the Discovery and Context Awareness (DCA) module. Within a PSG, the tenth module 720 may be configured to coordinate the duty cycle (e.g., sleep and/or awake start time, scheduling and the like) with the members of the PSG (e.g., other RSUs). This facilitates to maximize a group radio awake duration for the PSG (e.g., the time, when at least one RSU in the PSG is awake). The tenth module may be configured to receive information about the duty cycle (e.g., radio sleep information) of one or more members of the PSG, e.g., in accordance with the DCAP. For example, the tenth module may be configured to align the duty cycles (e.g., radio sleep duration) and/or to schedule the duty cycle of one or more members of the PSG or its resources (such as CPU, sensor duty cycle or operating system duty cycle, and the like). For example, the tenth module may be configured to align the duty cycles (e.g., radio sleep duration) and/or to schedule the duty cycle of one or more subsystems of the RSU 100a or its resources (such as CPU, sensor duty cycle or operating system duty cycle, and the like).

An eleventh module 722 (also referred to as PSL and PSG-Aware Request-Response Handler) may be configured to manage a data-processing (e.g., computing) and/or communication request (a response thereto), e.g., specifically when the RSU 100a is operating in accordance with one or more PSM and/or is member of a PSG. For example, the eleventh module may be configured to identify a compute service request to be compute-intense and select one or more processors 102 (e.g., CPUs) to awake at one or more members (e.g., RSUs) of the PSG. In another example, the eleventh module may be configured to determine one or more tasks (e.g., application requests and/or service packets), determine an operation quality target (e.g., QoS) and/or one or more requirements of the one or more tasks, and select one of the awake RSUs to process the one or more tasks.

When the RSU 100a is a leader of a PSG, the Power Saving Recommender and Governor module may be configured to determine (e.g., select) a GPSS for the PSG (also referred to as GPSS determination). The Power Saving Recommender and Governor module may implement one or more algorithms configured to determine (e.g., recommend) the GPSS based on information about the members of the PSG, e.g., being transmitted to the leader in accordance with the DCAP. Examples of the information about the members of the PSG may include one or more of the following: resource information (e.g., compute and/or communication and/or sensing resources) of one or more members of the PSG; and/or a PSL selected by one or more members of the PSG.

Generally, the resource information of a RSS 100 (e.g., member of the PSG, RSU, or vehicle) may include information about one or more resources (e.g., about one or more subsystems) of the RSS 100. Examples of the resource information may include one or more of following: (e.g., predicted) information about the architecture (e.g., components) of one or more subsystems of the RSS 100; (e.g., predicted) information about the workload (e.g., usage) of one or more subsystems of the RSS 100; (e.g., predicted) information about the capability (e.g., services) of one or more subsystems of the RSS 100. For example, the resource information may include information about one or more of: sensing workload, data-processing workload and/or communication workload, e.g., a respective predicted workload.

More details for implementing the power saving strategy (e.g., GPSS) and the instructions in accordance with the power saving strategy are disclosed in the following.

Figure 8:
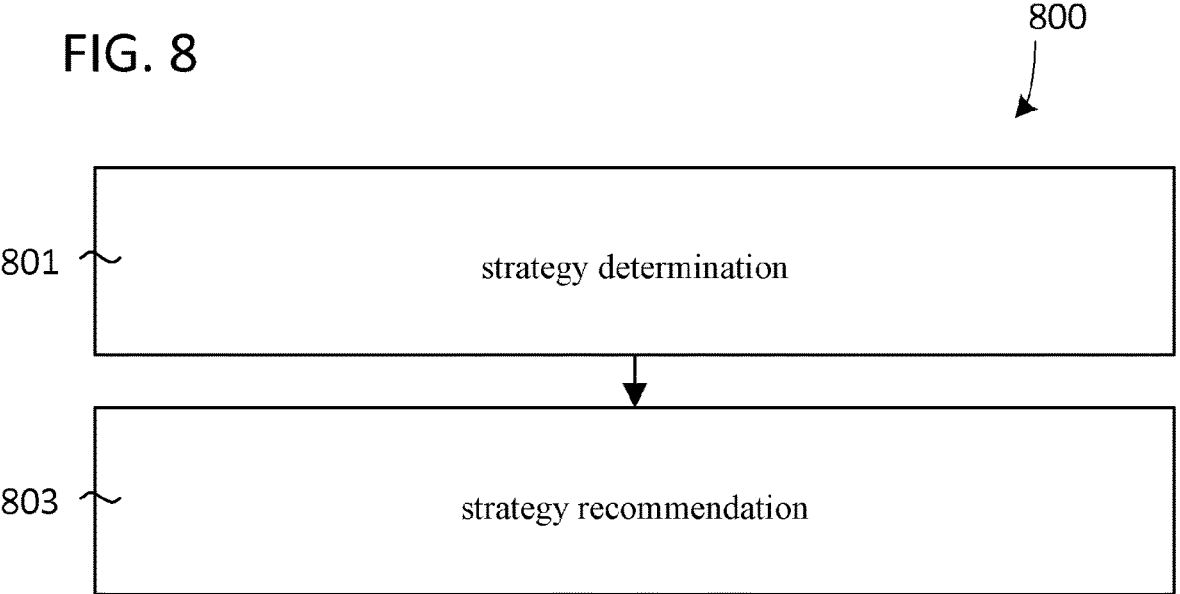
FIG. 8 shows a method in accordance with various aspects of the present disclosure.

FIG. 8 shows a method 800 in accordance with various aspects of the present disclosure. The method 800 may include, in 801, to determine a power saving strategy (also referred to as strategy determination 801). The strategy determination 801 may include to determine (e.g., select) multiple PSM 802 (herein also referred to as target PSM) based on a (e.g., trained) power saving model 604 of a RSS 100 and on a PST assigned to the RSS 100. The multiple power saving modes may include at least two of: a first power saving mode 802a for the data-processing subsystem 402 (e.g., its processor subsystem), a second power saving mode 802b for the sensing subsystem 404, and a power saving mode 802c for the communication subsystem 406.

For example, the strategy determination 801 may include to select the first power saving mode 802a from a first PSM-set assigned the data-processing subsystem 402. For example, the strategy determination 801 may include to select the second power saving mode 802b from a second PSM-set assigned the sensing subsystem 404. For example, the strategy determination 801 may include to select the third power saving mode 802c from a third PSM-set assigned a communication subsystem 406.

The method 800 may include, in 803 (also referred to as strategy recommendation 803), generate a recommendation for the RSS 100 to operate in accordance with the multiple target PSM. For example, the strategy recommendation 803 may include an instruction to operate in accordance with the multiple power saving modes (in this case also referred to as strategy instruction 803).

Figure 9:
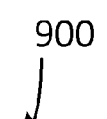
FIG. 9 shows the operation of the RSS in a first scenario in accordance with various aspects of the present disclosure.
Figure 9:
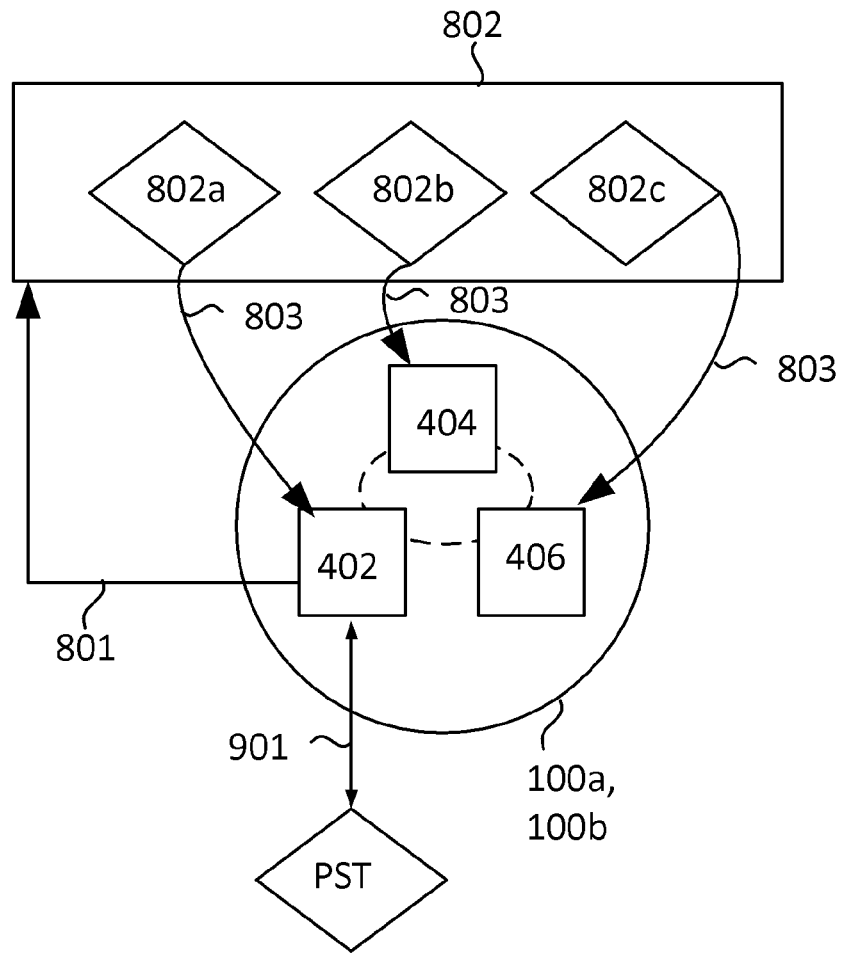

FIG. 9 shows the operation of the RSS 100 in a first scenario 900 in accordance with various aspects of the present disclosure (e.g., implementing the self-optimization). In the first scenario, the RSS 100 is a single road sensing device 100a, 100b (e.g., a RSU 100a or vehicle 100b), e.g., within the same thermal enclosure. In this scenario, the strategy determination 801 and the strategy instruction 803 may be performed by the data-processing subsystem 402 (e.g., its Power Saving Recommender and Governor) of the road sensing device 100a, 100b. Illustratively, the strategy determination 801 and the strategy instruction 803 are within the borders of a single RSU 100a, e.g., without collaboration with other RSUs.

Optionally, the road sensing device 100a, 100b may be configured to receive 901 the PST from a system-extern device (e.g., an operator 352 or controller) having the authorization for controlling (e.g., instructing) the road sensing device via the communication subsystem 406. Additionally or alternatively, the road sensing device 100a, 100b may be configured to determine 901 the PST as detailed later, e.g., by the data-processing subsystem 402 (e.g., its Power Saving Recommender and Governor). Illustratively, there is no PSG formation needed for minimizing the power consumption and each RSU may independently operate in accordance with one or more PSM as detailed in the following.

In the following, various methods are disclosed for the implementation of the operation in accordance with the applied PSM 802a, 802b, 802c (also referred to as power saving operation).

The power saving operation of the sensor subsystem 404 (also referred to as sensing power optimization) may be configured to reduce the power consumption of the sensor subsystem 404 as function of the PSM applied to the sensor subsystem 404. Generally, not all sensors of the sensor subsystem 404 may be necessary to be activated all the time and the activation and/or deactivation may be based on the context information and demand information.

Examples of the sensing power optimization may include to deactivate (e.g., turn off) one or more sensors or on-device processing based on context information and demand information. For example, one or more cameras may be deactivated, when the context information indicates a night time or, when other redundant sensors are on. In case of a sensor subsystem 404 including multiple cameras, the RSU 100a may include a view importance estimator model, which is configured to select a subset of cameras (e.g., having overlapping views), which are capable of sensing an object of interest on the road. The video analytics pipeline on the rest of the cameras may be deactivated (e.g., turned off) to save power.

Examples of the sensing power optimization may include to change the duty cycle (e.g., the sensing rate) of one or more sensors of the sensor subsystem 404, e.g., based on information about the sensed environment (e.g., ambient conditions, road and/or traffic) and/or time information. For example, the duty cycle may be reduced, when the road usage (herein also referred to as traffic) is sparse, at night, or in rural areas.

The power saving operation of the data-processing subsystem 402 (also referred to as computing and/or processing power optimization) may reduce the power consumption of the data-processing subsystem 402 (e.g., the processor subsystem) in accordance with the PSM applied to the data-processing subsystem 402.

Examples of the computing and/or processing power optimization may include a workload orchestration across heterogeneous processors (CPU, iGPU, VPU/HDDL, FPGA/HDDL, dGPU) of the RSS 100 based on real-time thermal demands of the hardware and ambient conditions (e.g., ambient temperature), to which the RSS 100 is exposed. This addresses that one or more processors may operate worse, when the ambient temperature is increased or when being exposed to a temperature above the maximum working temperature. A thermal design power (TDP) may be calculated for one or more processors with a critical workload that would drive the processor to the point of thermal gating. Various workloads that operate with the TDP yield varying thermal performances in each processor are based on various factors like type of workload, timing and sequence of compute events, type of compute being used, throughput, latency, and/or accuracy required, etc. On the other hand, the same workload yields different thermal, throughput, latency and accuracy performance in different processors available in the heterogeneous architecture.

A workload orchestration, e.g., using platforms like Kubernetes, provides the flexibility of offloading workloads (or parts of workloads) to different processors in the heterogeneous data-processing subsystem 402. e.g., dynamically, based on the determined demand information (e.g., computing demand).

In an exemplarily implementation, the RSU (e.g., the sensor subsystem 404) may include one or more temperature sensors configured to sense one or more temperatures. Examples of the one or more temperatures include: the ambient temperature, to which the RSU 100a is exposed; the temperature of upstreaming air from another electric devices in the cabinet, a temperature within the thermal enclosure of the RSU 100a. The power saving model 602 may be configured to offload one or more tasks (e.g., the corresponding workload) based on information about the thermal limitation of one or more processors of the data-processing subsystem 402 and/or based on the temperature information (optionally along with compute demand, scalability and/or availability).

This allows to shift some of the thermal compliance demands from thermal engineering to this thermally aware dynamic workload orchestration system. For example, the operating temperature may be extended beyond the range of the TDP or the capability of the cooling system. In a less complex implementation, more work may be offloaded in response to a cooler ambient temperature, less for hotter ambient temperature, and balance those across other processors.

According to various aspects, the workload orchestration may be enhanced, e.g., by using supervised or reinforcement learning (RL), and by recording thermal outputs along with performance measures (e.g., throughput, latency, accuracy) at various workloads. The RSU 100a may be configured to learn what layers and/or kernels contribute to which level of thermal output, when run with a given throughput and/or latency target and precision. In that way, depending on the ambient conditions, the orchestrator may be configured to adaptively determine, how to distribute the current workload across processors of the data-processing subsystem 402 and what modifications to throughput and/or latency and/or accuracy could be made to meet the thermal demands and prevent thermal throttling.

In case of one or more processors of the data-processing subsystem 402 being a multi-core CPU, examples of the computing and/or processing power optimization may include maintaining only a limited number of CPU-cores activated (e.g., by configuring C-states C0, C1 and C6 of Cores on Intel Architecture) and/or operate the CPU at lower frequency (e.g., by configuring different P-states P0 to Pn of Cores on Intel Architecture) in case of sparse compute demand, e.g., during non-busy hours or when processing latency is relaxed. Further power saving may be achieved by shutting down all cores of the CPU and associated circuitries (e.g., by configuring Package C-states PC3, Deep C3 or PC6 on Intel Architecture), e.g., when computing workload is not expected. To this end, the use of one or more AI (e.g., ML) model(s) configured to predict computing workload and keeping several CPU cores activated based on the prediction to minimize power and reduce time to CPU transition from idle (e.g., C-State) to active state may be beneficial.

Leveraging low-power processors in Network Interface Controller, e.g., smartNIC (a type of network interface card), of RSUs and offloading edge micro-services to the Network Interface Controller (e.g., smartNIC), while keeping CPU cores to sleep state, facilitates to save power. According to various aspects, the RSU 100a may include a module (herein also referred to as microservice offloading module) configured to determine the resource and performance requirement of one or more micro-services, current CPU workload, networking/packet processing demand, desired power savings level (PSL), and, based thereon, to dynamically determine, whether the one or more micro-services are offloaded to Network Interface Controller (e.g., smartNIC) to minimize power consumption, e.g., while meeting the operation quality target. The output of this microservice offloading module may be supplied to a controller module, which installs packet parsing rules into on-NIC storage, such that incoming packets are routed to locally configured microservices instead of being supplied to the CPU-cores. The packet parsing rules may be defined using some declarative language such as P4 and implemented on a P4-supported Network Interface Controller (e.g., smartNIC).

In case, the RSU 100a (in this case also referred to as green RSU) has access to the supply with green power (also referred to as renewable energy), examples of the computing and/or processing power optimization may include that the RSU 100 receives green power (e.g., when the RSU is equipped with one or more solar and/or wind generators) and may be optionally connected to a grid power supply (e.g., as backup, when green power is low). Additionally or alternatively, the green RSU may be assigned to a higher priority than other members of the PSG. For example, the RSU may be configured to determine an impact on the operation quality of the RSG, when offloading or shifting workload to one or more green RSUs. For example, the latency due to compute offloading to one or more green RSUs may increase the latency of the PSG. For example, an increased communication latency for data exchange as well as processing latency may occur, when a green RSU has lower compute power. For example, assigning one or more tasks to the green RSU may be performed only, when an impact on the operation quality is below a threshold.

The power saving operation of the communication subsystem 406 (also referred to communication (e.g., protocol stack) operation optimization) may be configured to reduce the power consumption of the communication subsystem 406 as function of the PSM applied to the sensor subsystem 404. Examples of the communication operation optimization may include to configure the communication radio (shortly also referred to as radio) to awake with a periodic sleep cycle (e.g., a mechanism similar to 3GPP LTE/NR DRX). When the RSU is acting as a time synchronization reference source, the sleep period may be small enough ensuring that the time alignment is not impacted. If a NS (e.g., GNSS) is providing time synchronization, the NS may be kept running, while the radio is sleeping. The power saving model may include one or more (e.g., AI (e.g., ML)) models of the communication subsystem 406, being configured to predict the communication workload based on one or more operation quality targets (e.g., QoS requirements), which may be used to dynamically or semi-statically select an optimal period of sleep cycles (see an example of a functional framework for RL-based model as detailed later).

Examples of the communication operation optimization may include to authorize the sensor subsystem 404 to activate the communication subsystem 406 or at least one or more components of the communication subsystem 406 (e.g., radio and/or modem). A low-power sensor (e.g., with on-device processing or with processing availability on the same RSU) may be configured to sense (e.g., monitor) the environment of the RSU 100a, e.g., continuously, when the one or more components of the communication subsystem 406 are deactivated, in order to determine, whether the environment fulfils a criterion to activate the one or more components of the communication subsystem 406. For example, when the sensor detects motion within the coverage of RSU 100a, it may indicate the orchestrator to wake up the one or more components of the communication subsystem 406 (e.g., the radio modem). Alternately, the orchestrator may be configured to activate the radio based on sensing data indicated by the sensor.

In some cases, the RSU 100*a* is a green RSU 100*a* (in this case also referred to as only-green RSU) without a connection to a power grid (e.g., a road sign with limited functionality). The only-green RSU may be configured to reduce the PST, when determining (e.g., predicting) that the received green power is below a threshold. For example, when the green power runs low, the only-green RSU may change one or more target PSM to provide one or more selected services for longer period. For example, the only-green RSU may be configured to schedule its activation and/or deactivation, e.g., by sleeping with periodic awake period to disseminate information. When the road users (e.g., vehicles) may pass multiple of such only-green RSUs, disseminating this information with longer period may be acceptable. For example, an only-green RSUs may be arranged in an rural area, out of town roads, etc., where the power grid may not be practical or cost-efficient. These only-green RSUs may serve as legitimate RSS to provide and/or display road signs, speed limits and similar information. However, the amount of green power available may vary due to many factors including weather, day of time, etc.

Figure 10:
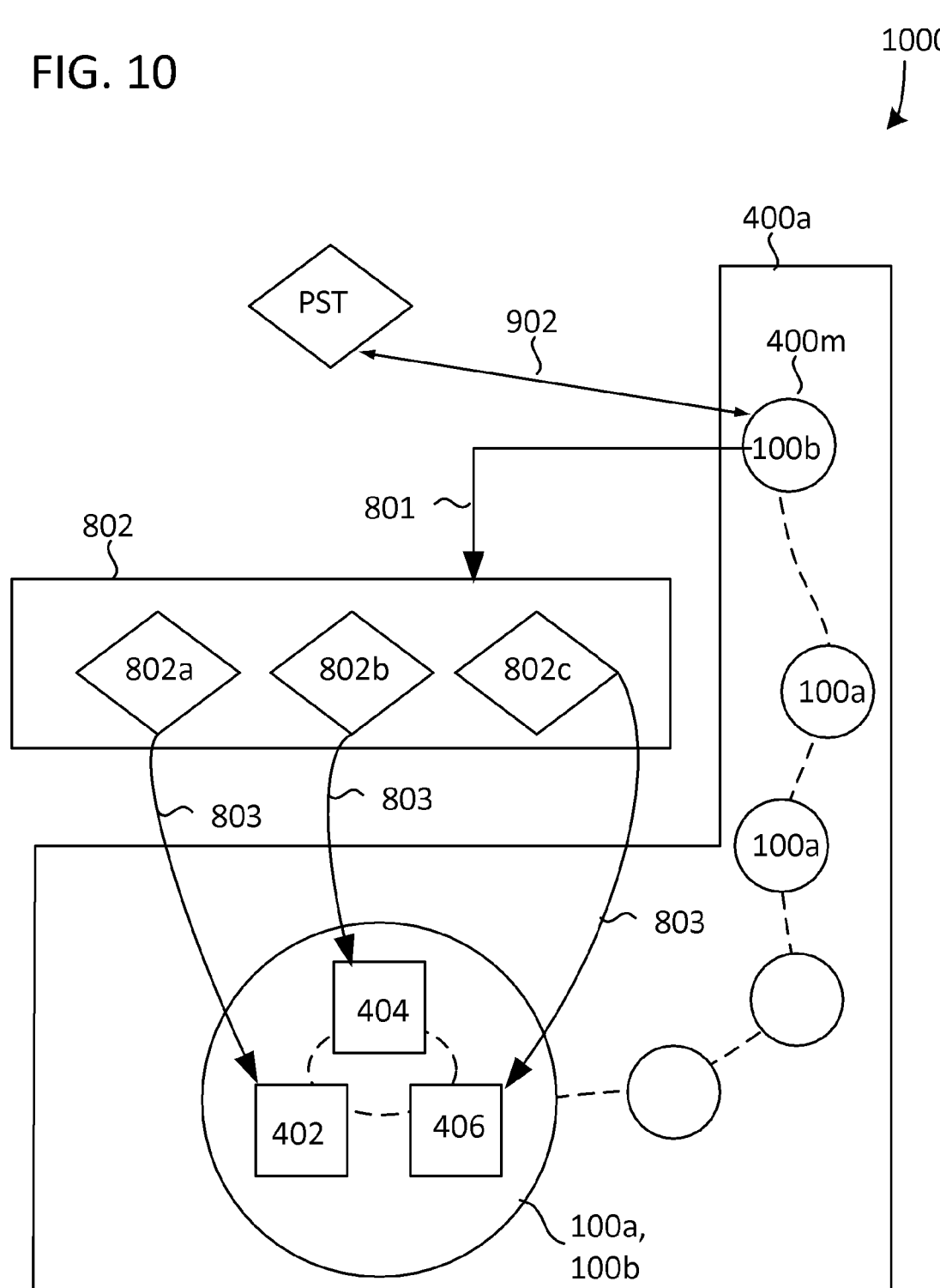
FIG. 10 shows the operation of the RSS in a second scenario in accordance with various aspects of the present disclosure.

FIG. 10 shows the operation of the RSS 100 in a second scenario 1000 in accordance with various aspects of the present disclosure. In the second scenario, the RSS 100 includes one or more PSGs, of which each PSG includes multiple members (e.g., vehicles or RSU).

In the second scenario, the strategy determination 801 and the strategy recommendation 803 may be performed by a member 400*m* of the PSG other than the road sensing device 100*a*, 100*b*, e.g., by the data-processing subsystem 402 (e.g., its Power Saving Recommender and Governor) of the member 400*m*. Optionally, the member 400*m* of the PSG may be the leader of the PSG (also referred to as leading member).

Optionally, the member 400*m* of the PSG may be configured to receive 901 the PST, e.g., from the operator or from the road sensing device 100*a*, 100*b*. Additionally or alternatively, the member 400*m* of the PSG may be configured to determine 901 the PST as detailed later, e.g., by the data-processing subsystem 402 (e.g., its Power Saving Recommender and Governor) of the member 400*m* of the PSG and/or based on the DCAM and/or other messages exchanged in accordance with the group management.

As outlined above, the DCAP may include a protocol for group management. An exemplarily implementation of the DCAP will be outlined in the following.

Figure 11:
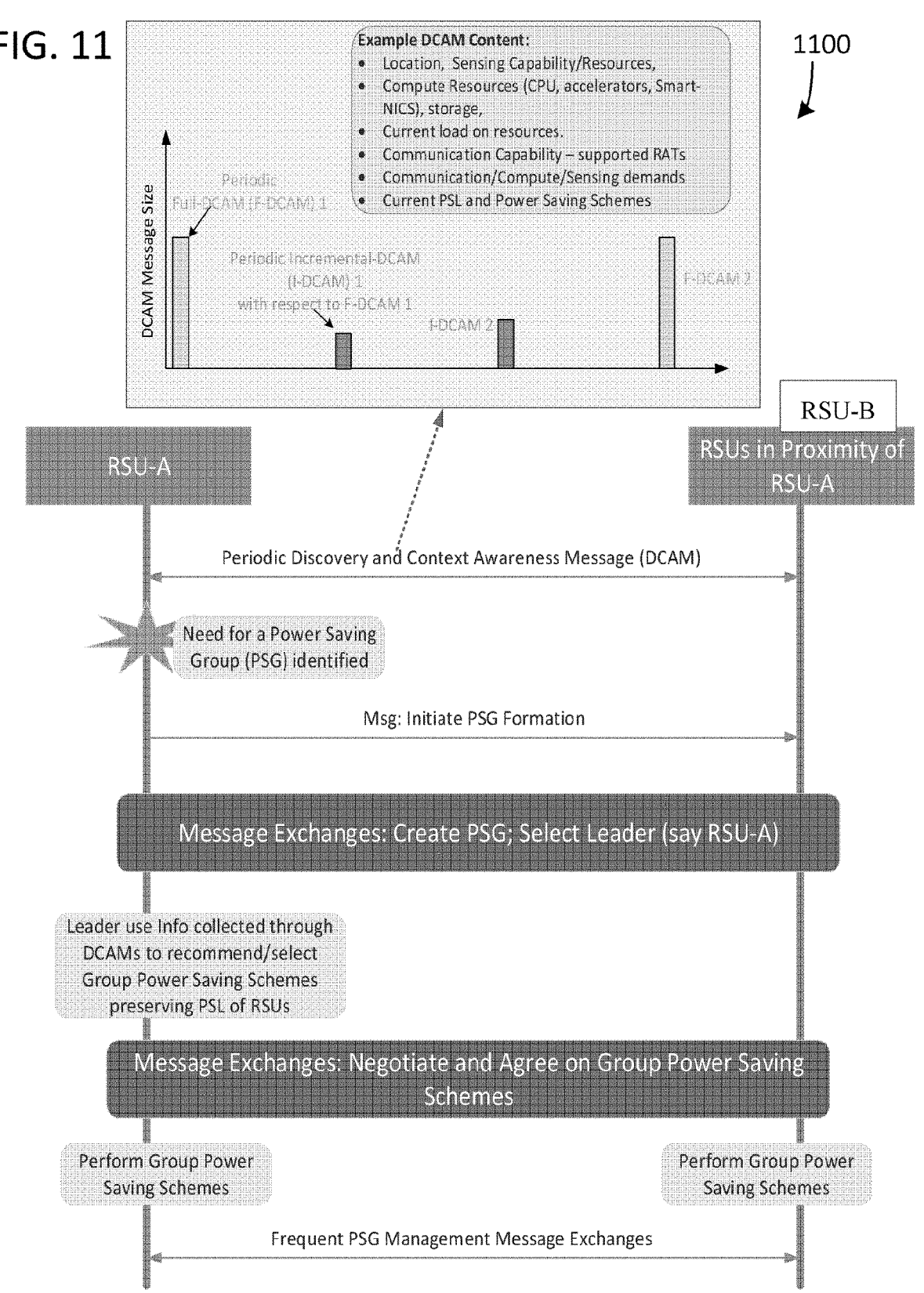
FIG. 11 shows a communication diagram for the communication between multiple RSU in accordance with various aspects of the present disclosure.

FIG. 11 shows a communication diagram 1100 for the communication between multiple RSU 100*a* (e.g., RSU-A and one or more RSU-B), which are configured in accordance with the DCAP, in accordance with various aspects of the present disclosure.

In some scenarios, such as urban roads or busy highways, there may be a dense deployment of RSUs (also referred to as RSU cluster) being capable of communicating with each other (e.g., being in communication range). Examples of the communication between multiple RSUs may include: backhaul (wireless or wired) or peer-to-peer wireless communication, e.g., including multi-hop communication via one or more road users (e.g., vehicles).

In at least one period (e.g., hours or days), the RSUs of the RSU cluster may be fully active to fulfil the one or more operation quality targets, e.g., communication quality targets, computing quality targets and/or sensing quality targets of smart transportation. During a non-busy period (e.g., hours or days), there may be limited traffic with reduced or heavily reduced operation quality target for communication, computing and/or sensing. In case of reduced or heavily reduced operation quality targets for communication, compute and/or sensing, some or most of the RSUs of the RSU cluster may operate in accordance with a PST providing a low power consumption, e.g., to maintain reasonable operation quality targets for smart transportation services. One or more individual RSUs may apply one or more PSM to achieve the PST. However, there may be still capacity beyond the individual reduction of the power consumption, when the coordination among the RSUs the RSU cluster is achieved. Such coordination among the RSUs the RSU cluster may reduce the overall power consumption, e.g., by forming a PSG as detailed herein. However, the PSG may be also beneficial for other scenarios.

In the following, reference will be made to a RSS 100 being configured to trigger the formation of the a PSG (also referred to as PSG formation). The references made may analogously apply to an operator or any type of centralized controller being configured to trigger the PSG formation. For example, one or more RSUs of the RSU cluster may be configured to trigger the PSG formation. For example, the RSS 100 may be configured to trigger the PSG formation in the event (also referred to as PSG trigger) that one or more factors fulfill a criterion. The criterion may be fulfilled, when the factor (e.g., representing the capacity of power saving in the second operation mode) exceeds a predetermined threshold. An example of the threshold may represent the capacity of power saving in the first operation mode.

Other examples of the PSG trigger may include: a sensing demand is below the threshold, a computing demand is below the threshold, a communication demand is below the threshold, when the context information fulfills a criterion (e.g., at night-time, holidays, road blockage, etc.). More examples of the PSG trigger may include: predicted and/or perceived communication workload is below the threshold, predicted and/or perceived computing workload is below the threshold, predicted and/or perceived sensing workload is below the threshold.

According to various aspects, the power saving model may include a model (also referred to as PSG trigger model), e.g., including one or more algorithms, configured to determine the PSG trigger and generate one or more messages indicating the PSG formation. The PSG trigger model may be configured as part of the facility layer and/or middleware (e.g., between Application and Transport/Network layers).

The PSG operating according to DCAP causes all members (e.g., RSUs) of the PSG being configured to share resource (such as CPU, accelerators, Smart-NICS, storage, communication/compute demands) information including current workload on such resources. According to the DCAP, a leader (similar to centralized controller) may be selected to coordinate the resource management and power saving strategy.

In an exemplarily implementation, the DCAP is continuously running at facility layer and/or middleware. Each RSU operating according to DCAP may be configured to periodically send a message (also referred to as DCAM) to one or more proximate RSUs, the DCAM including resource information. Examples of the resource information of the DCAM may include one or more of the following: information about the architecture (e.g., components) of the one or more subsystems of the RSU; information about the workload (e.g., usage) of the one or more subsystems of the RSU; and/or information about the capability (e.g., services) of the one or more subsystems of the RSU. For example, the resource information may include (e.g., predicted) information about one or more of: sensing workload, computing workload and/or communication workload. Illustratively, DCAP enables each RSU to be aware of proximity communication topology among RSUs and sensing, compute, communication resources and/or capabilities at proximity RSUs.

Exemplary message components of the DCAM may include one or more of the following:

| Example Content of Discovery and Context Awareness Message (DCAM) | |
| --- | --- |
| Message component: | Message information: |
| RSU Information | RSU/Node Id, Location |
| Sensing Capability/Resources Information | Info about Sensors at RSU like LiDAR, Radar, Camera; |
| Compute Resources | CPU, accelerators, Smart-NICS info |
| Cache/Storage Information | Total Cache, Available Cache |
| Current workload on Resources | Current workload/occupancy info for compute and storage resources |
| Communication Capability | supported RATs |
| Perceived/Predicted | Perceived or Predicted |
| Communication/Compute/Sensing Demands | Communication, Compute, Sensing workload info |
| Current PSL and Power Saving Schemes | Current PSL and Power Saving Schemes in operation to achieve the PSL |
| Wake Up Sensor Availability | Availability of a low-power sensor based Radio/Modem Wake up |
| PSG Info | If RSU is active member of a current power saving group (PSG) |

One or more subsequently generated DCAMs may differ from each other, e.g., by one or more of the above message components. For example, a full-DCAM may include some or all of the above components. An incremental-DCAM may include less message components than the full-DCAM. Since some of the message information of the DCAM do not change frequently, one or more of the above message components may be waived for some of the DCAMs.

For example, the RSU may be configured to generate a full-DCAM with less rate (also referred to as DCAM rate) than generating one or more incremental-DCAMs. For example, the RSU may be configured to transmit one or more incremental-DCAMs between two subsequent full-DCAMs. For example, the RSU may be configured to set the periodicity of transmitting the full-DCAMs as integer multiples of the periodicity of transmitting the incremental-DCAM.

The RSU (e.g., its Power Saving Group Handler) may be configured to continuously monitor, whether the PSG trigger is determined. When the RSU (in this example RSU-A) determines the PSG trigger (for example, RSU-A), this triggers the PSG formation by sending a message proposing (e.g., indicating) the PSG formation (also referred to as "Msg: Initiate PSG Formation" or as PFM).

Exemplary components of the PFM may include: the identity of the PSG (e.g., an identifier), the identity of the origin (sender) of the PFM (e.g., of RSU-A). For example, the identity of the RSU (also referred to as RSU-Id) may be used as identity of the origin of the PFM.

According to various aspects, the RSU may be configured to determine the identity of the PSG (also referred to as PSG-Id) based on one or more of the following: the RSU-Id; the geolocation of the RSU; and a time stamp; an incremental value. The time stamp may include the time of determining the PSG trigger (also referred to as PSG initiation time) and/or the time of generating the PFM (also referred to as PSG formation time).

Exemplary message components of the PFM may include one or more of the following:

| Example Content of PFM | |
| --- | --- |
| Message component: | Message information: |
| Initiating RSU-Id | |
| Derived PSG-Id | |
| Reason for PSG Formation | predicted or perceived Communication/Compute/Sensing Demands; context (night-time, holidays, road blockage, etc); etc |
| Intention-to-Serve-as-PSG-Leader | Initiating RSU may indicate its willingness to serve as the leader of PSG |
| PSG-Formation-Initiation-Time | It helps to resolve multiple such PSG-Formation initiations in the same proximity simultaneously. For example, in case of multiple such initiations, Msg-Initiate-PSG-Formation with earliest PSG-Formation-Initiation-Time may get highest priority. |

Each PSU operating in accordance with DCAP may be configured to respond to the PFM, e.g., by a response message. The response message may indicate, whether the PSU joins the PSG or declines to join the PSG. Optional components of the response message may include the RSU-Id, time of response, actual power saving strategy (e.g., PST and/or one or more PSM), the PSG-Id of the PSG being member of, and the like.

For example, when a RSU 100a receives multiple PFM (e.g., when multiple PSG formations occur in the same period, e.g., overlapping each other), the RSU 100a may be configured to favor (e.g., prioritize) the PSG formation indicated by the PFM having the earliest time stamp (e.g., PSG formation time). As result, the RSU may decline to join each PSG, except the favored PSG.

Optionally, the PSG formation may include the exchange of one or more further message between the members of the PSG.

Initially, the initiating RSU-A may act as the leader of the PSG to coordinate the PSG formation. Optionally, e.g., after the PSG is formed, another member of the PSG may be selected as leader, e.g., based on one or more selection criteria defined by DCAP. Examples of the one or more selection criteria may include: the member with highest compute capability; the member, which is not inactive (e.g., its radio is not in sleep mode or its compute resources are not in sleep states); the member with better average communication links among all or most of the members in the PSG.

The Power Saving Recommender and Governor module of the leader may include one or more intelligent algorithms to recommend a group power saving strategy based on the information about the members of the PGS (also referred to as member information). Each member of the PSG may be configured to (e.g., repeatedly) transmit information about the member (also referred to as member information) via the DCAM. Examples of the member information may include: the power saving strategy of the member; and/or resource information of the member, e.g., including predicted information about one or more of: sensing workload, computing workload and/or communication workload.

The leader may be configured to transmit a message to the members of the PSG (also referred to as Msg: Group Power Saving Strategy or as PSSM), the PSSM including the recommended group power saving strategy. Optionally, the leader may be configured to negotiate, with one or more members of the PSG, the group power saving strategy, e.g., by updating the group power saving strategy. Exemplary components of the group power saving strategy may include: for each member, a proposed PST assigned to the member; and/or for each member one or more proposed PSM assigned to the member.

Exemplary message components of the PSSM may include one or more of the following:

| Example Content of Msg-Group-Power-Saving-Strategy | |
| --- | --- |
| Recommended PSL (power saving level) for each PSG Member | Recommended PSL is equal to or greater than current PSL of the member |
| Power Saving Schemes for each PSG member | For each Member, it specifies a combination of power saving schemes to achieve recommended new PSL. Example Power Saving Schemes may be one or more of Sensing Power Optimization: Shutting down or running one or more (e.g., selected or all) sensors at low-power mode like reduced sensing rate, Computing and/or processing Power Optimization: moving one or more (e.g., selected or all) cores to Idle, running one or more (e.g., selected or all) CPUs at lower frequency, Smart workload orchestration across heterogeneous processors (CPU, iGPU, VPU/HDDL, FPGA/HDDL, dGPU), etc Communication/Protocol Stack Operation Optimization: moving radio/modem in Idle/Sleep mode with/without periodic awake in a coordinated way. |

The RSU 100a, e.g., its Power Saving Recommender and Governor Module, acting as leader and/or the power saving model may be configured to update the group power saving strategy based on one or more changes of the member information (or other information available about the members), e.g., being transmitted in accordance with the DCAP.

The members of the PSG may be configured to repeatedly transmit the DCAM (e.g., periodically), and/or to adjust the rate (amount per time) of transmitting the DCAM, e.g., in order to align the DCAM rate with its radio awaking rate (e.g., duration and/or periodicity).

Optionally, the leader may be configured to periodically send one or more aggregated-PSG-DCAMs including the member information of each member of the PSG.

Optionally, the leader may be configured to operate in accordance with a PST and/or PSM, which does not deactivate the communication subsystem 406 or one or more components of the communication subsystem 406. Alternatively, the leader may be configured to operate in accordance with a PST and/or PSM, which provides for the highest duty cycle of the communication subsystem 406 among the PSG. For example, the radio-sleep state or radio-awake periodicity of leader may be configured shorter. This facilitates that the leader may repeat aggregated-PSG-DCAM sufficient enough, so that at least one copy of aggregated-PSG-DCAM is received by each member of the PSG within a reasonable time.

Optionally, the group power saving strategy may provide for a coordinated resource management (e.g., to facilitate the computing, and/or processing power optimization) of the PSG as outlined in the following. For example, the group power saving strategy may be configured to select one or more members of the SDP as awake members and one or more members of the PSG as sleeping members. Each sleeping member may be configured to deactivate its data-processing subsystem 402, while keeping the communication subsystem 406 active. Any compute requirements and/or request at the one or more sleeping members may be transmitted (e.g., forwarded) to one or more active members of the PSG (which are not sleeping, e.g., with active data-processing subsystem 402).

The PSG, e.g., the leader (e.g., its PSL and PSG-Aware Request-Response Handler module) of the PSG, may be configured to determine an operation quality target (e.g., QoS) of one or more tasks, and to select one or more of the awake RSUs (also referred to as RSU selection) of the PSG to process the one or more tasks based on the operation quality target. Examples of the one or more tasks may include one or more application requests and/or one or more service packets. Said more generally, the PSG (e.g., the leader) may be configured to change the assignment of the one or more tasks from a first (e.g., sleeping) member of PSG to a second (e.g., awake) member of the PSG (also referred to as "task offload" or shorter "offload"), e.g., based on a first power saving strategy (e.g., PST and/or PSM) of the first member and/or based on a second power saving strategy (e.g., PST and/or PSM) of the second member, e.g., based on a difference between the first power saving strategy and the second power saving strategy.

The RSU selection may be a function of one or more of: workload balancing among multiple awake RSUs, resource availability at awake RSUs, and amount of data to be transferred for processing the one or more application requests and/or service packets. In in some aspects, the PSG, e.g., the leader, may be configured to determine, whether the amount of data to be transferred to perform the task offload exceeds a threshold, and (when determined so) to activate the data-processing subsystem 402 of one or more members of the PSG (e.g., those, a task was originally assigned to), in order to minimize communication overhead.

As outlined above, the offloading a less complex task (e.g., less computing and/or processing hungry service) may include to assign the task to a subsystem of the (e.g., sleeping) member other than the data-processing subsystem 402 (also referred to as subsystem selection), e.g., to the sensor subsystem 404 and/or to the communication subsystem 406, e.g., to the accelerators or the Network Interface Controller (e.g., smartNIC), when including one or more wimpy cores in the PSG. Analogously, the subsystem selection may be a function of one or more of: workload balancing among multiple RSUs, resource availability at RSUs, and amount of data to be transferred for processing the one or more application requests and/or service packets. For example, the task offload of micro-services may enable to keep the data-processing subsystem 402 of the member deactivated (e.g., keep one or more CPUs in sleep state to save power).

The PSG, e.g., the leader (e.g., its PSL and PSG-Aware Request-Response Handler module) of the PSG, may be configured to determine a task (e.g., compute service request) at a member of the PSG to be compute-intense and to select at least one processor (e.g., CPU) of the data-processing subsystem 402 of member to be activated.

Optionally, the group power saving strategy may provide for a communication and/or protocol stack operation optimization as detailed in the following.

The group power saving strategy may be configured to deactivate the communication subsystem 406 (e.g., communication radios) of one or more selected members of the PSG, e.g., periodically and/or in a coordinated way (e.g., a mechanism similar to 3GPP LTE/NR DRX), e.g., by scheduling the deactivation and/or activation of the communication subsystem 406. For example, the GPSS determination may include to select one or more sleep periods of a member in such a way that vehicles or potential vehicles in the area covered by PSG may reach an RSU at any time (or within a given latency bound), for example, by 1- or 2-hop peer-to-peer communication for a task (e.g., compute or other) request. For example, the GPSS determination may include to select one or more members of the PSG to sleep and/or determine one or more sleep periods and/or one or more sleep-start-cycles for the selected one or more members in coordinated way. In some aspects, the GPSS determination may include to continuously determine the PSG topology and/or determine a demand map. An updated PSG topology and/or demand map may trigger to select one or more members of the PSG to sleep, and/or determine one or more sleep periods and/or sleep-start-cycles for the selected one or more members.

The PSG, e.g., the leader (e.g., its Coordinated Communication Stack Power Management module) of the PSG, may be configured to manage the coordination (e.g., by negotiation) of the timing for activation and/or deactivation (e.g., sleep awake start time) with the members of the PSG in order to maximize a group radio awake duration for the PSG (e.g., the aggregated time, when at least one member of the PSG is activated or awake). The coordination may be based in radio sleep information about one or more members of the PSG, e.g., in accordance with DCAP.

Figure 12:
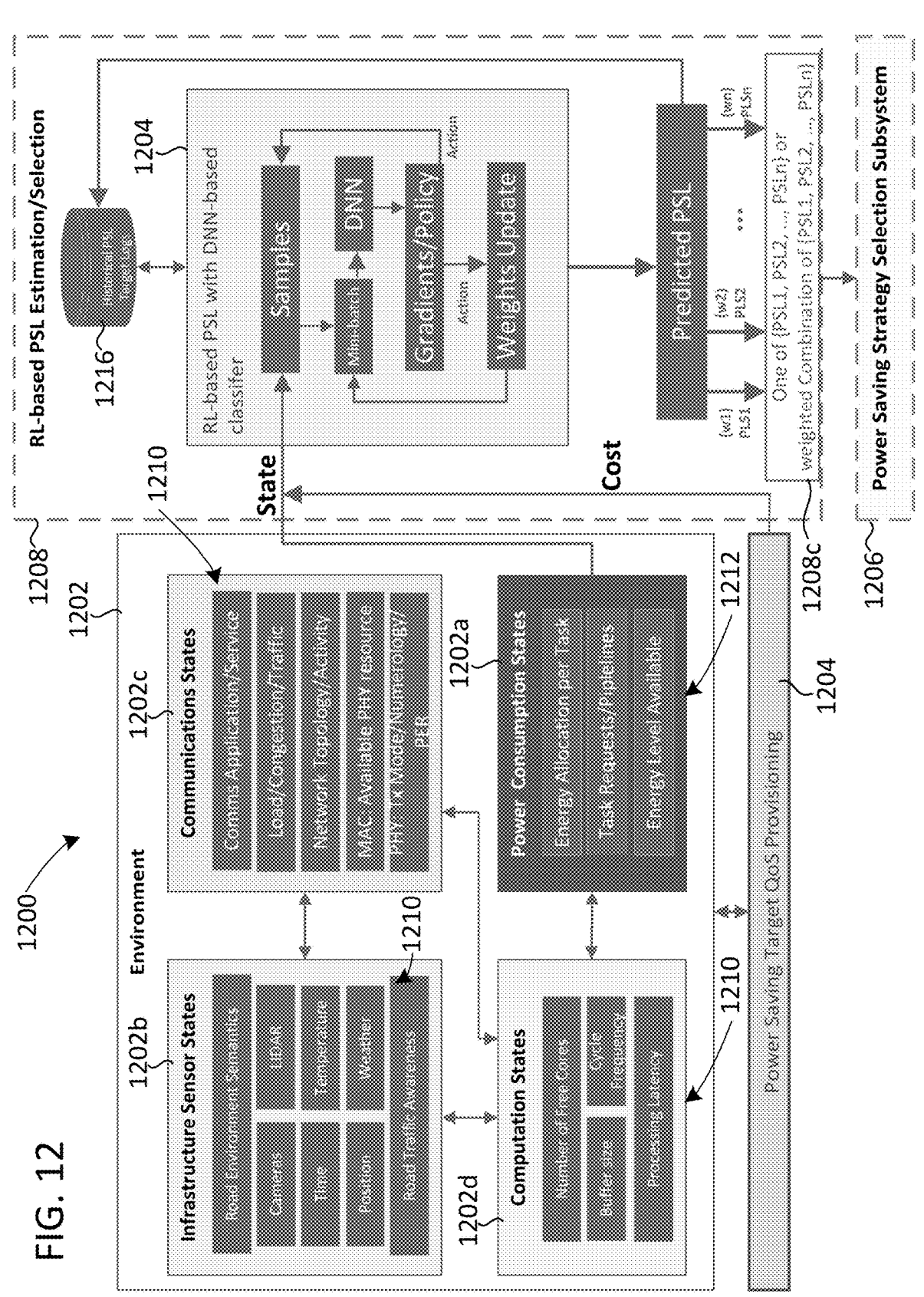
FIG. 12 shows an exemplarily architecture of the power saving model in accordance with various aspects of the present disclosure.

FIG. 12 shows an exemplarily architecture 1200 of the power saving model 604 in accordance with various aspects of the present disclosure. The architecture 1200 of the power saving model 602 may be based on a reinforcement learning (RL)-based framework with one or more DNN-based classification algorithms. For example, the power saving model 602 may be configured to discretize the available power saving strategies into classes. The power saving model 602 may be implemented in each RSU or vehicle, e.g., each member of a PSG, or in the operator.

In the following, reference will be made to the determination of PSL. The references made, may analogously apply to the determination of any type of power saving strategy, e.g., GPSS or PSM.

In a first configuration, the power saving model 602 may be configured to determine (e.g., output) the PSL based on the model input data 604, e.g., by a PSL determination subsystem 1208 (e.g., including one or more RL-models). The determination of the PSL may be include one or more of the following: an estimation (also referred to as PSL estimation), a selection (also referred to as PSL selection), or a prediction (also referred to as PSL prediction) of the PSL, e.g., determining on one or more weighted predicted PSLs 1208c. The PSL prediction may include to convert multiple predicted {PSLi}, each having a probability {wi}, into the determined PSL, e.g., ({w1, w2} {PSL1, PSL2})→PST. For example, the PSL determination may include to determine one PSL per operation quality target (e.g., including a service and/or QoS provisioning).

An example of the conversion of the multiple predicted {PSLi} into the determined PSL (also referred to as PSL conversation) may include to select one PSL from the multiple predicted {PSLi} as determined PSL (e.g., a PSL selection based on the multiple predicted {PSLi}). Another example of the PSL conversation may include to average the multiple predicted {PSLi}, e.g., by their probability as weight, wherein the average is the determined PSL.

In yet another example of the PSL conversation, a PSL selection may be based on the multiple predicted {PSLi}, including to select one (e.g., the i-th) PSL of the PSL-set 254 as determined PSL, e.g., {PSL0, . . . , PSLi, . . . PSLn}→PST=PSLi. For example, the weight of PSLi may be set to 1, wherein the weight of each PSLj OM may be set to zero, thus outputting a single PSL.

In a second configuration (additionally or alternatively, to the first configuration), the power saving model 602 may be configured to determine (e.g., output) the multiple PSM based on the model input data 604, e.g., by a PSM determination subsystem (e.g., including one or more RL-models). The determination of the multiple PSM may be based on an estimation (also referred to as PSM estimation), may be based on a selection (also referred to as PSM selection), or may be based on a prediction (also referred to as PSM prediction) of the PSM, analogously to the PSL determination. The PSM selection may include to select, for each (e.g., the s-th) subsystem, one (e.g., the i-th) PSM of the PSM-set 256 (which is assigned to the subsystem) as determined PSM, e.g., $\{PSM0, \ldots, PSLi, \ldots PSMn\}_s \rightarrow PSM_s = PSMi$.

In an exemplarily implementation, the power saving model may include a power saving strategy selection subsystem 1206 including the PSM determination subsystem. In this implementation, the one or more determined PSL (e.g., one PSL per operation quality target) is supplied to the power saving strategy selection subsystem 1206, e.g., the PSM determination subsystem. The power saving strategy selection subsystem 1206 (e.g., the PSM determination subsystem) may be configured to determine the multiple PSM based on the determined PSL (e.g., being set as PST).

As outlined above, the determination of the power saving strategy may be based on the determined (e.g., predicted) PSL and/or the determined multiple PSMs. For example, the determined PSL and/or PMSs may be input to the determination (e.g., selection) of one or more power saving strategies.

The RL-framework of the power saving model 602 may include an state determination subsystem 1202. The state determination subsystem 1202 may include a power consumption model 1202a and one or more of the following subsystem models: a model 1202b of the sensor subsystem 404, a model 1202c of the communication subsystem 406, and/or a model 1202d of the data-processing subsystem 402. Optionally, the state determination subsystem 1202 may include one or more of the following auxiliary models: a model of an environment of the RSU 100a and/or a model of a thermal output of the road sensing system.

Each subsystem model may be configured to determine subsystem state information 1210 (e.g., including an estimation and/or an prediction thereof) indicating a state of the respective subsystem (also referred to as subsystem state), e.g., the sensor states in case of the sensor subsystem 404, and provide the subsystem state information 1210 to one or more of the following: one or more other subsystem model, and/or the power consumption model 1202a. The model of an environment of the RSU 100a may be configured to provide environmental information (e.g., including an estimation and/or an prediction thereof) indicating a state of the road, e.g., the traffic thereon, and provide the environmental information to one or more of the following: one or more of the subsystem models, and/or the power consumption model 1202a. The model of a thermal output may be configured to determine the thermal output information, e.g., based on the subsystem state information 1210, and to provide the thermal output information to one or more of the following: one or more other subsystem model, and/or the power consumption model 1202a.

The illustrated framework may facilitate the determination (e.g., including an estimation and/or selection) of the PSL based on one or more operation quality targets 1204*t* as model input data 604. For example, the power saving model may include an operation quality target provisioning subsystem 1204 configured to provide (e.g., determine) the one or more operation quality targets 1204*t*, e.g., to one or more of the following: the state determination subsystem 1202, PSL determination subsystem 1208 and/or the PSM determination subsystem. Examples of the one or more operation quality targets may include: one or more service level and/or one or more QoS levels. For example, the power saving model 604 (e.g., the PSL determination subsystem 1208 and/or the PSM determination subsystem) may be configured to process the one or more operation quality targets 1204*t* as costs input data. The costs input data may serve as the costs imposing constraints.

The power consumption model 1202*a* may be configured to determine power consumption information 1212 (e.g., including an estimation and/or an prediction thereof) indicating a power consumption state of the RSU 100*a*, e.g., a power consumption state of one or more (e.g., each) of its subsystems. For example, the power consumption model 1202*a* may be configured to determine the power consumption information 1212 based on the subsystem state information 1210 output by one or more of the following subsystem models: the model 1202*b* of the sensor subsystem 404, the model 1202*c* of the communication subsystem 406, and/or the model 1202*d* of the data-processing subsystem 402. Optionally, the power consumption model 1202*a* may be configured to determine power consumption information 1212 based on one or more of the following: the environmental information and/or the thermal output information.

Examples of the subsystem state information 1210 may indicate one or more of the following subsystem states: one or more intermediate subsystem states, one or more real-time subsystem states, one or more estimated subsystem states, one or more predicted subsystem states (e.g., having a certain probability).

Examples of the power consumption information 1212 may indicate one or more of the following power consumption states (e.g., of a subsystem): one or more intermediate power consumption states, one or more real-time power consumption states, one or more estimated power consumption states, one or more predicted power consumption states (e.g., having a certain probability). The power consumption information 1212 may be a function of the subsystem state information 1210 output by one or more of the following: the model 1202*b* of the sensor subsystem 404, the model 1202*c* of the communication subsystem 406, and/or the model 1202*d* of the data-processing subsystem 402.

In an exemplarily implementation, the output of state determination subsystem 1202 may include or may be the output of the power consumption model 1202*a*, e.g., the power consumption information 1212 or value (e.g., an integer), representing the power consumption information 1212.

In an exemplarily implementation, the output of the power consumption model 1202*a* is a function of the state one or more of the following:

the infrastructure sensors including of road environment semantic, sensor and road traffic, the communication processing states including the full communications stack from applications/services, message traffic, network, and the underlying PHY/MAC impacting the available communications resources (per applications or in aggregation), the computation-related states consisting of the available number of cores, memory/buffer cycle frequency, latency budget, etc.

The PSL determination subsystem 1208 and/or the PSM determination subsystem may be configured to process the output of the state determination subsystem 1202 as input data and/or the one or more operation quality targets 1204*t* as costs input data (e.g., the power saving target QoS). The costs input data may serve as the costs imposing constraints.

For example, PSL determination subsystem 1208 and/or the PSM determination subsystem may include a classifier 1214 (e.g., RL-based classifier using a DNN trained for classification), which may be configured to process (as input data) one or more of the following: the output of the state determination subsystem 1202 and/or the one or more operation quality targets 1204*t*.

Optionally, the classifier 1214 may be configured to process historical information 1216 (as input data), e.g., historical PSL target logs. Examples of the historical information may include one or more data sets having a time stamp indicating the time of recording the data set (e.g., before the time of processing). Each of the data sets may include one or more of following data: one or more power saving strategies applied at the time stamp; a result of operation in accordance with the one or more power saving strategies at the time stamp; information about the RSU (e.g., including the subsystem state information 1210 and/or power consumption information 1212), when the operation of the road sensing system was in accordance with the one or more power saving strategies at the time stamp; the environmental information at the time stamp and/or the thermal output information. Illustratively, the historical information 1216 may include information obtained from the past operational state's observation. For example, the output of the classifier 1204 may include the determined (e.g., predicted or estimated) PSL, which may be based on a weighted combination of multiple PSLi (i={0, . . . , n}) as outlined above.

According to various aspects, the determined PSL may analogously be supplied to an equivalent Power saving strategy selection subsystem which could be based on a similar RL-framework to yield the recommendation for one or more of power saving strategy selection.

In an exemplarily implementation, the references made to the PSL determination subsystem 1208 may analogously apply to the power saving strategy selection subsystem 1206 (e.g., the PSM determination subsystem). For example, the power saving strategy selection subsystem 1206 (e.g., the PSM determination subsystem) may include on a similar RL-framework to yield the recommendation of the PSM, e.g., for one or more power saving strategy selection.

In an exemplarily implementation, the model of the environment of the RSU 100*a* may include a vehicle workload forecast model. The vehicle workload forecast model may include one or more (e.g., AI (e.g., ML)) based algorithms, for example, a time-series analysis prediction model. The vehicle workload forecast model may be configured to provide a vehicle load (e.g., traffic intensity) forecast, e.g., based on one or more of the following: the historical information 1216, the context information (e.g., the date), and/or the environmental information. For example, the PSL determination subsystem 1208 may be configured to determine the PSL based on the vehicle workload forecast.

An example of the time-series analysis prediction model may include a one or more "autoregressive integrated moving average (ARIMA) models". The time-series analysis prediction model may be configured to determine a vehicles network traffic (e.g., AI) model based on the history of a number of vehicles in the environment of the RSU (e.g., at road junctions or highways). The vehicles network traffic model (or at least one or more of the components thereof) may be stored in the RSS, in the cloud or another system-extern storage.

The vehicle workload forecast model (e.g., by the data-processing subsystem 402) may be configured to determine data (also referred to as traffic data) representing the number of (e.g., network connected) vehicles over a predetermined period of time. The vehicles network traffic model (e.g., AI model) may be configured to use the traffic data as training data for training the vehicles network traffic model.

For example, the vehicles network traffic model may be configured, e.g., trained (e.g., using the training data), to categorize the current state of the traffic into one of multiple (e.g., 3 or more) categories, each representing one traffic scenario (e.g., A, B and C). These scenarios represent the number of vehicles recorded during different time of the day. Based on the prediction, the power saving model may determine a (e.g., recommended) PSM for the orchestrator of the RSUs (e.g., its data-processing subsystem 402 and/or communication subsystem 406). This facilitates to perform the appropriate action by recommending the right PSL for the RSU based on the trained model.

Traffic scenario A (e.g., peak traffic and/or between 8 am and 4 pm) may correspond to the prediction of the highest number of vehicles. In response to determining scenario A, the RSUs may be operative with full capacity, e.g., by determining PSL0 as PST.

Traffic scenario B (e.g., half peak traffic and/or between 4 pm and 11 pm] may correspond to the prediction of ⅔ of vehicles compared to the peak traffic. In response to determining scenario B, the RSU may be operative with ⅔ of the capacity, e.g., by determining PSL1 as PST.

Traffic scenario C [e.g., off peak traffic and/or between 11 pm and 8 am] may correspond to the prediction of less than ½ of the vehicles compared to the peak traffic. In response to determining scenario C, the RSU may be operative with ½ of the capacity, e.g., by determining PSL2 as PST.

Figure 13:
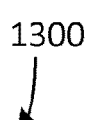
FIG. 13 shows an exemplarily method for determining the power saving strategy in accordance with various aspects of the present disclosure.

FIG. 13 shows an exemplarily method 1300 for determining the power saving strategy in accordance with various aspects of the present disclosure. The method 1300 may be performed by a RSS, e.g., a RSU (e.g., the target RSU), e.g., its data-processing subsystem 402, a member (e.g., the leader) of a PSG being different from the target RSU (e.g., when the target RSU is member of the PSG), or the operator.

The method 1300 may include, in 1301, to determine power consumption information 1212, e.g., representing one or more power consumption states of the RSS (e.g., RSU), based on information 1302 about a current state of the RSS (e.g., including subsystem state information 1210) and based on the (e.g., trained) power saving model 602 (e.g., on the power consumption model 1202a), e.g., being configured to determine the power consumption information 1212 based on the information about a current state of the RSS.

The method 1300 may include, in 801, to determine a power saving strategy (also referred to as strategy determination 801) for the RSS based on the power consumption information 1212, e.g., on the one or more power consumption states of the RSS (e.g., RSU).

The strategy determination 801 may include to determine one or more recommended PSL based on the power consumption information 1212 and/or based on the (e.g., trained) power saving model 602 (e.g., on the PSL determination subsystem 1208), e.g., being configured to determine the one or more recommended PSL based on the power consumption information 1212.

The strategy determination 801 may include to select one of the one or more recommended PSL as PST, e.g., by the PSL determination subsystem 1208. For example, the strategy determination 801 may include to assign the PST to the target RSU 100a. When the strategy determination 801 includes to determine only one recommended PSL, the only recommended PSL may be automatically be the PST.

The strategy determination 801 may include to determine multiple PSM based on the PST (e.g., being assigned to the target RSU 100a) and based on the (e.g., trained) power saving model 602 (e.g., by the PSM determination subsystem), e.g., being configured to provide the multiple PSM based on the PST.

Additionally or alternatively, the methods and functions disclosed herein may be performed by a vehicle, e.g., an autonomous vehicle 100b (AV), as outlined exemplarily below.

Similar to the power saving strategy applied to an RSU, a combination of PSM (such as shutting down select or all sensors, running select or all sensors at low-power mode like reduced sensing rate and/or reduced precision level, moving selected or all cores to Idle, running select or all CPUs at lower frequency, putting radio or modem in Idle or Sleep mode with or without periodic awake, etc.) may be determined and applied to a vehicle 100b based on a PST assigned to the vehicle 100b, e.g., an autonomous vehicle 100b (AV).

Predicted demands for one or more tasks (e.g., sensing and/or computing and/or communication) of the vehicle 100b along with one or more predetermined operation quality targets (e.g., QoS requirements) may be used along with context information to (e.g., dynamically or semi-statically) determine a PST for an vehicle 100b, e.g., by using intelligent algorithms deployed as the (e.g., AI (e.g., ML)-based) power saving model 602 at the vehicle 100b.

Examples of such context information may include (but are not limited to): day of the week, time of the day, peak hours and non-peak hours, geo-area, month, season, long term demands learned over time, available coordination among proximity AVs and proximity RSUs, and resources available at AVs and proximity RSUs for compute offloading, etc.

The power saving model 602 may be optionally configured to, in proximity to a RSU, determine a (e.g., recommended) PSL for one or more other vehicles 100b (e.g., AVs) being in proximity to (e.g., in a geo-area of) the RSU, e.g., for a specific time or specific situation. The ML-based power saving model 602 may also be configured to (e.g., intelligently) select one or more combinations of multiple PSM for the or each vehicle 100b to achieve the PST. This facilitates to obtain closer to optimal solution compared to that obtained by using traditional heuristic-based (non-ML) algorithms.

The power saving model 602 may be configured to determine the multiple PSM for the vehicle 100b based on the context information one or more demands and/or one or more demand tradeoffs. For example, not all sensors may be necessary to be active all the time.

According to various aspects, the multiple PSM applied to the vehicle 100b may be configured to instruct an activation or deactivation of one or more sensors of the vehicle 100b. Additionally or alternatively, the multiple PSM applied to the vehicle 100b may be configured to instruct the deactivation of one or more sensors of the sensor subsystem 404 or one or more processors of the data-processing subsystem

402 of the vehicle 100*b*. For example, the power saving model 602 may be configured to determine, e.g., when the context information indicate night or when other sensors are activated, a PSM instructing one or more of the following: the deactivation of one or more cameras; reduction of the duty cycle of one or more sensors and/or a reduction of the precision (e.g., when road users are sparse, e.g., in night, or in rural/non-residential areas).

Analogously to the above, a fine-grained control of multi-core CPUs may facilitate to reduce the power consumption, while ensuring performance guarantee may be applied. Examples of the fine-grained control of multi-core CPUs may include one or more of the following: (i) reduce the number of activated CPU-Cores (e.g., by configuring C-states C0, C1 and C6 of Cores on Intel Architecture) and/or reducing the frequency of one or more CPUs (e.g., by configuring different P-states P0 to Pn of Cores on Intel Architecture), e.g., in case of sparse compute demand, e.g., during non-busy hours or when processing latency is low. Further power saving may be achieved by deactivating (e.g., shutting down) all the cores and associated circuitries (e.g., by configuring Package C-states PC3, Deep C3 or PC6 on Intel Architecture), e.g., when predicted computing workload is below a predetermined threshold. (ii) usage of one or more CPUs may be coordinated, e.g., with the sensing PSM as well. If some sensors are deactivated (e.g., in idle mode) or operating with smaller duty cycles, the processing of sensed data is no longer needed, and hence one or more CPUs responsible for such processing may be deactivated or may be reduced in frequency.

The communication subsystem 406 (e.g., communication radio) of vehicle 100*b* may be configured to awake with a periodic sleep cycle (e.g., a similar to 3GPP LTE/NR DRX). When the vehicle 100*b* is acting as a time synchronization reference source, the sleep period may be small enough, thus ensuring time alignment is not impacted. If NS (e.g., GNSS) is providing time synchronization, the NS (e.g., GNSS) may be kept running while radio is sleeping.

Additionally or alternatively, the PSM may be configured to activate the communication subsystem 406 (e.g., radio and/or modem) triggered by one or more sensors of the sensor subsystem 404. A low-power sensor (e.g., with on-device processing) may sense and/or monitor the environment of the vehicle 100*b* continuously, when the communication subsystem 406 is deactivated, e.g., to predict the need for waking up the communication subsystem 406. For example, when the sensor detects a motion within the coverage of the vehicle 100*b*, it may be configured to instruct the orchestrator to wake up the communication subsystem 406 (e.g., the radio modem). Alternatively, the orchestrator may be configured to determine, whether to activate the communication subsystem 406 based on the sensing data, which the sensor provides.

Analogously to the above, the PSG may be configured to provide a collaboration among one or more proximity vehicles 100*b* and optionally one or more RSUs (when available in the proximity) to further enhance overall power consumption of a PSG. Such collaborative PSG of AVs and RSUs may reduce the power consumption of redundant resources (such as sensing and/or compute resources) further. The DCAP may be configured to be applied to one or more vehicles 100*b*. Such vehicles 100*b* may be aware of proximity communication topology among AVs and RSUs and (e.g., sensing and/or computing and/or communication) capabilities in proximity. The PSG may configure AVs and RSUs of the PSG to share resources and demand information in order to jointly optimize (e.g., sensing and/or computing and/or processing) operations and/or communication, in order to achieve maximum group power saving of the PSG. A leader (an vehicle 100*b* or a proximity RSU) of the PSG may be configured to coordinate the members of the PSG, e.g., with respect to resource management and/or the determination of the group power saving strategy (e.g., PSL and/or PSM).

With reference to the above, the power saving model 602 may be configured to accept information indicating an operator's preference as input data. This enables the operator the set a PST (also referred to as PSL target) for one or more RSU, e.g., to the costs of a tradeoff on operation quality.

In the following, various aspects of the present disclosure will be illustrated:

Example 1 is a method including determining (e.g., by a road sensing system (RSS), the operator or another RSS) multiple power saving modes based on a (e.g., trained) model (e.g., a power saving model) of the network communicative (e.g., first) road sensing system (e.g., vehicle or RSU) and on a power saving target assigned to the road sensing system; the multiple power saving modes including a first power saving mode for a first power consuming subsystem (e.g., data-processing subsystem) of the road sensing system and a second power saving mode for a second power consuming subsystem (e.g., a sensor subsystem) of the road sensing system; generating a recommendation (or instruction) for the road sensing system to operate in accordance with the multiple power saving modes.

Example 2 is the method of example 1, wherein the determination of the multiple power saving modes includes one or more of: to select the first power saving mode from a stored (e.g., by the road sensing system (RSS)) first plurality of power saving modes, and to select the second power saving mode from a stored (e.g., by the road sensing system (RSS) second plurality of power saving modes.

Example 3 is the method of example 2, wherein the first and/or second plurality of power saving modes include at least two power saving modes that differ from each other in one or more of the following: a power consumption of the respective (e.g., first or second) power consuming subsystem; a duty cycle of one or more components of the respective (e.g., first or second) power consuming subsystem; a number of activated or deactivated components of the respective (e.g., first or second) power consuming subsystem; an assignment of a task type to one or more components of the respective (e.g., first or second) power consuming subsystem; a telemetry rate of the road sensing system; a thermal output of the respective (e.g., first or second) power consuming subsystem or a spatial distribution of the thermal output.

Example 4 is the method of one of examples 1 to 3, wherein the power saving target is assigned to the road sensing system by a system-extern device (e.g., group leader or operator) having the authorization for controlling (e.g., instructing) the road sensing system (e.g., via a network).

Example 5 is the method of one of examples 1 to 4, wherein the first power consuming subsystem includes one or more sensors and/or a sensing chain.

Example 6 is the method of one of examples 1 to 5, wherein the second power consuming subsystem includes one or more processors (e.g., being configured to perform the method) and/or one or more memories.

Example 7 is the method of one of examples 1 to 6, wherein the multiple power saving modes include a third power saving mode for a third power consuming subsystem (e.g., a communication subsystem) of the road sensing system.

Example 8 is the method of example 7, wherein the third power consuming subsystem includes a network communication interface configured to communicate in accordance with one or more network communication protocols (e.g., according to which the road sensing system is network communicative) and/or one or more transceivers.

Example 9 is the method of one of examples 1 to 8, further including to: determine (e.g., by the RSS, the operator or another RSS) a (e.g., system-intern) redundancy of components of the first and/or second and/or third power consuming subsystems, wherein the determination of the multiple power saving modes is based on the system-intern redundancy.

Example 10 is the method of one of examples 1 to 9, further including to: determine (e.g., by the RSS, the operator or another RSS) resource information about one or more network communicative road sensing systems in proximity of the road sensing system; determine (e.g., by the RSS, the operator or another RSS) a (e.g., system-extern) redundancy of components of a plurality of road sensing systems including the road sensing system and the one or more network communicative road sensing systems; wherein the determination of the multiple power saving modes is based on the (e.g., system-extern) redundancy.

Example 11 is the method of one of examples 1 to 10, wherein the determination of the multiple power saving modes is further based on stored historical information about one or more of the following: one or more power saving strategies applied to the operation of the road sensing system; a result of operating the road sensing system in accordance with the one or more power saving strategies; information about the road sensing system, when the operation of the road sensing system is in accordance with the one or more power saving strategies.

Example 12 is the method of one of examples 1 to 11, further including to: generate (e.g., by the RSS, the operator or another RSS) a message to a system-extern device (e.g., another RSS, e.g., a group member, or the operator) indicating one or more of: the multiple power saving modes; the power saving target; information about the road sensing system, when the operation in accordance with the multiple power saving modes is performed; a result of the operation in accordance with the multiple power saving modes.

Example 13 is the method of one of examples 10 to 12, wherein the information about the road sensing system includes resource information and/or context information.

Example 14 is a method (e.g., for PSL determination), e.g., being configured according to one of examples 1 to 13, the method including: determine (e.g., by the RSS, the operator or another RSS) a power consumption state of a network communicative road sensing system based on a model of the road sensing system; and determine (e.g., by the RSS, the operator or another RSS) a power saving strategy for the road sensing system based on the power consumption state, and preferably on an operation quality target for the road sensing system; wherein the power saving strategy optionally includes the power saving target assigned to the road sensing system.

Example 15 is the method of example 14, wherein the determination of the power consumption state is further based on context information, e.g., including information about a time of the determination of the power saving strategy (e.g., indicating season or day or daytime) and/or information about (e.g., traffic on) a road sensed by the road sensing system (e.g., indicating traffic is sparse or not).

Example 16 is the method of example 14 or 15, wherein the determination of the power consumption state is further based on information about one or more of: (e.g., a current or past state of) the road sensing system, (e.g., a current or past state of) another the road sensing system (e.g., a member of a group), one or more system-externally provided demands (e.g., operation quality target and/or power saving preference provided by operators); context information; resource information of the road sensing system or another the road sensing system.

Example 17 is the method of one of examples 14 to 16, further including to: generate (e.g., by the RSS, the operator or another RSS) a recommendation (or instruction) for the road sensing system to operate in accordance with the power saving strategy.

Example 18 is the method of one of examples 14 to 17, further including to: generate (e.g., by the RSS, the operator or another RSS) a message to a system-extern device (e.g., another road sensing system, e.g., a member of a group, or the operator) indicating the power saving strategy.

Example 19 is the method of one of examples 14 to 18, further including to: provide the operation quality target to the model.

Example 20 is the method of one of examples 14 to 19, wherein the determination of the power saving strategy is further based on stored historical information about one or more of the following: one or more power saving strategies applied to the operation of the road sensing system; a result of operating the road sensing system in accordance with the one or more power saving strategies; information about the road sensing system, when the operation of the road sensing system is in accordance with the one or more power saving strategies.

Example 21 is a method (e.g., for GPSS determination and/or collaborative power saving), e.g., being configured in accordance with of one of examples 1 to 20, the method including: determine (e.g., by the RSS, the operator or another RSS) a first power saving strategy for a network communicative first road sensing system based on a message from a network communicative second road sensing system, the message indicating one or more of: a second power saving strategy of the second road sensing system; and resource information of the second road sensing system; generate (e.g., by the RSS, the operator or another RSS) a recommendation (or instruction) for the first road sensing system to operate in accordance with the first power saving strategy.

Example 22 is the method of example 21, further including to: determine (e.g., negotiate, e.g., with the first road sensing system), e.g., based on a response of the first road sensing system to the recommendation, an update of one or more of: the first power saving strategy, and the second power saving strategy.

Example 23 is the method of example 21 or 22, further including to: determine (e.g., by the RSS, the operator or another RSS), e.g., negotiate (e.g., with the second road sensing system), an update of the second power saving strategy, e.g., based on first power saving strategy (or an update thereof); and generate (e.g., by the RSS, the operator or another RSS) a recommendation (or instruction) for the second road sensing system to operate in accordance with the update of the second power saving strategy.

Example 24 is the method of one of examples 21 to 23, further including to: determine (e.g., negotiate, e.g., with the first road sensing system) based on a change of the resource information of the second road sensing system, an update of one or more of: the first power saving strategy, and the second power saving strategy.

Example 25 is the method of one of examples 21 to 24, wherein the first power saving strategy is determined (e.g., updated and/or negotiated) based on resource information of the first road sensing system.

Example 26 is the method of one of examples 21 to 25, wherein the first power saving strategy is determined (e.g., updated and/or negotiated) based on a power consumption state of the first road sensing system, e.g., output by the model.

Example 27 is the method of one of examples 21 to 26, wherein the first power saving strategy is determined (e.g., updated and/or negotiated) based on a model of the first road sensing system and/or model of a group of road sensing systems including the first road sensing system and the second road sensing system as member of the group.

Example 28 is the method of one of examples 21 to 27, further including to: generate (e.g., by the RSS, the operator or another RSS) a message for the second road sensing system indicating (e.g., instruction) one or more of: the first second power saving strategy or an update of the first second power saving strategy; and resource information of the first road sensing system or an update of the resource information of the first road sensing system.

Example 29 is the method of one of examples 21 to 28, further including to: trigger (e.g., by the RSS, the operator or another RSS) the determination of the first power saving strategy in response to determining an event, the event including one or more of the following: an instruction from a system-extern device (e.g., an operator) having the authorization for controlling (e.g., instructing) the first and/or second road sensing systems (e.g., via a network); a change of context information of the first and/or second road sensing systems; a change of resource information of the first and/or second road sensing system, e.g., by another message indicating the change.

Example 30 is the method of one of examples 21 to 29, further including to: request (e.g., by the RSS, the operator or another RSS) the message from the second road sensing system.

Example 31 is the method of one of examples 21 to 30, further including to: add (e.g., by the RSS, the operator or another RSS) one or more members to a group of road sensing systems, the one or more members including one or more of: the first road sensing system, and the second road sensing system; and, generate a message to the group of road sensing systems (e.g., to each member of group of road sensing systems) indicating one or more of: an identity of the group of road sensing systems; a proposal for a leader of the group of road sensing systems; resource information and/or context information of the one or more members; a time of adding the one or more members; a time stamp assigned to the group of road sensing systems; the first power saving strategy or an update of the first power saving strategy; the second power saving strategy or an update of the second power saving strategy.

Example 32 is the method of example 31, further including to: negotiate (e.g., by the RSS, the operator or another RSS) a leader of the group of road sensing systems with members of the group of road sensing systems, e.g., based on resource information about one or more (e.g., each) members of the group of road sensing systems.

Example 33 is the method of example 31 or 32, further including to: determine (e.g., by the RSS, the operator or another RSS), e.g., negotiate with one or more members of the group of road sensing systems, a group power saving strategy (e.g., based one or more of the following of the one or more members: resource information, context information, power consumption information) of the one or more members, the group power saving strategy including the first power saving strategy, and the second power saving strategy.

Example 34 is the method of one of examples 31 to 33, further including to: determine (e.g., by the RSS, the operator or another RSS) a (e.g., group-intern) redundancy of components of the first road sensing system and the second road sensing system, wherein the determination of the first power saving strategy and/or the second power saving strategy is based on the (e.g., system-intern) redundancy.

Example 35 is the method of one of examples 1 to 34, wherein the (e.g., first and/or second) road sensing system is member of a group of road sensing systems, and preferably, the message indicates an identity of the group of road sensing systems.

Example 36 is the method of one of examples 1 to 35, further including to determine (e.g., by the RSS, the operator or another RSS) one or more objects on a road sensed by the one or more sensors, e.g., to provide information about the environment of the RSS, e.g., as part of the context information.

Example 37 is the method of example 36, further including to generate (e.g., by the RSS, the operator or another RSS) a message to a system-extern device, the message indicating the one or more objects on the road.

Example 38 is the method of one of examples 1 to 37, wherein the RSS is a RSU or a vehicle.

Example 39 is the method of one of examples 1 to 38, wherein the or each message is generated in accordance with a network communication protocol (e.g., implemented by the respective RSS).

Example 40 is the method of one of examples 1 to 39, wherein the or each message is generated in accordance with a collaboration protocol (e.g., implemented by the respective RSS) of a group of RSS, e.g., identifying the group of RSS.

Example 41 is the method of one of examples 1 to 40, wherein the RSS is mounted stationary or includes a propulsion device.

Example 42 is the method of one of examples 1 to 41, further including to: update (e.g., train) (e.g., by the RSS, the operator or another RSS) the (e.g., power saving) model based on one or more of the following: the multiple power saving modes; information about the road sensing system (e.g., resource information and/or context information), when the operation in accordance with the multiple power saving modes is performed; a result of the operation in accordance with the multiple power saving modes; the power saving strategy; information about the road sensing system (e.g., resource information and/or context information), when the operation in accordance with the power saving strategy is performed; a result of the operation in accordance with the power saving strategy.

Example 43 is the method of one of examples 1 to 42, wherein the model of the road sensing system includes one or more of the following: a power saving model of the road sensing system; a (e.g., operation) model of a sensor subsystem of the road sensing system; a (e.g., operation) model of a communication subsystem of the road sensing system; a (e.g., operation) model of a processor subsystem of the road sensing system; a power consumption model of the road sensing system; a model of an environment of the road sensing system; a model of a thermal output of the road sensing system.

Example 44 is the method of one of examples 1 to 43, wherein the power saving strategy includes one or more of the following: a power saving target assigned to the road sensing system; multiple power saving modes including a first power saving mode for a first power consuming sub-system of the road sensing system and a second power saving mode for a second power consuming subsystem of the road sensing system; multiple weighted power saving targets assigned to the road sensing system.

Example 45 is a controller, including a processor configured to perform the method of one of examples 1 to 44.

Example 46 is a non-transitory computer-readable storage medium storing instruction which, when executed by a processor, implement a method of one of examples 1 to 45.

Example 47 is a road sensing system including the controller of example 45 or the non-transitory computer-readable storage medium of example 46.

Example 48 is the road sensing system of example 46 being a RSU and/or being configured to be mounted stationary (e.g., at the ground and/or a building).

Example 49 is the road sensing system of example 46, being a vehicle and/or including a propulsion device.

Example 50 is a means (e.g., being in accordance with one of examples 1 to 49) for recommending a multiple power saving modes, including: a processing means configured to: determine multiple power saving modes based on a power saving model of a network communicative road sensing system and on a power saving target assigned to the road sensing system; the multiple power saving modes including a first power saving mode for a first power consuming subsystem of the road sensing system and a second power saving mode for a second power consuming subsystem of the road sensing system; and generate a recommendation for the road sensing system to operate in accordance with the multiple power saving modes.

Example 51 is a means (e.g., being in accordance with one of examples 1 to 50) for determining a power saving strategy, including: a processing means configured to: determine a power consumption state of a network communicative road sensing system based on a model of the road sensing system; and determine a power saving strategy for the road sensing system based on the power consumption state.

Example 52 is a means (e.g., being in accordance with one of examples 1 to 51) for recommending a power saving strategy, including: determine a first power saving strategy for a network communicative first road sensing system based on a message from a network communicative second road sensing system, the message indicating one or more of: a second power saving strategy of the second road sensing system; and resource information of the second road sensing system; generate a recommendation for the first road sensing system to operate in accordance with the first power saving strategy.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A controller comprising:
   a processor configured to:
   determine multiple power saving modes based on a power saving model of a network communicative road sensing system and on a power saving target assigned to the road sensing system;
   wherein the multiple power saving modes comprise a first power saving mode for a first power consuming subsystem of the road sensing system and a second power saving mode for a second power consuming subsystem of the road sensing system; and
   generate a recommendation for the road sensing system to operate in accordance with the multiple power saving modes.

2. The controller of claim 1, wherein the determination of the multiple power saving modes comprises one or more of:
   selecting the first power saving mode from a stored first plurality of power saving modes, and
   selecting the second power saving mode from a stored second plurality of power saving modes.

3. The controller of claim 2, wherein the first plurality and/or the second plurality of power saving modes include at least two power saving modes, and wherein the at least two power saving modes differ from each other by any of:
   a power consumption of the respective power consuming subsystem;
   a duty cycle of one or more components of the respective power consuming subsystem;
   a number of activated or deactivated components of the respective power consuming subsystem;
   an assignment of a task type to one or more components of the respective power consuming subsystem;
   a telemetry rate of the road sensing system; or
   a thermal output of the respective power consuming subsystem or a spatial distribution of the thermal output.

4. The controller of claim 1, wherein the power saving target is assigned to the road sensing system by a system-extern device having the authorization for controlling the road sensing system via a network.

5. The controller of claim 1, wherein the first power consuming subsystem comprises one or more sensors.

6. The controller of claim 5, wherein the processor is further configured to determine one or more objects on a road sensed by the one or more sensors.

7. The controller of claim 6, wherein the processor is further configured to generate a message to a system-extern device, the message indicating the one or more objects on the road.

8. The controller of claim 1, wherein the second power consuming subsystem comprises the processor.

9. The controller of claim 1, wherein the multiple power saving modes comprise a third power saving mode for a third power consuming subsystem of the road sensing system.

10. The controller of claim 9, wherein the third power consuming subsystem comprises a network communication interface configured to communicate in accordance with one or more network communication protocols.

11. The controller of claim 1, wherein the processor is further configured to:

determine a system-intern redundancy of components of the first and/or second power consuming subsystems, wherein the determination of the multiple power saving modes is based on the system-intern redundancy.

12. The controller of claim 1, wherein the processor is further configured to:

determine resource information about one or more network communicative road sensing systems in proximity of the road sensing system;

determine a system-extern redundancy of components of a plurality of road sensing systems comprising the road sensing system and the one or more network communicative road sensing systems;

wherein the determination of the multiple power saving modes is based on the system-extern redundancy.

13. The controller of claim 1, wherein the determination of the multiple power saving modes is further based on stored historical information about one or more of the following:

one or more power saving strategies applied to the operation of the road sensing system;

a result of operating the road sensing system in accordance with the one or more power saving strategies;

information about the road sensing system, when the operation of the road sensing system is in accordance with the one or more power saving strategies.

14. The controller of claim 1, wherein the processor is further configured to update the power saving model based on one or more of the following:

the multiple power saving modes;

information about the road sensing system, when the operation in accordance with the multiple power saving modes is performed;

a result of the operation in accordance with the multiple power saving modes.

15. The controller of claim 1, wherein the processor is further configured to:

generate a message to a system-extern device indicating at least one of:

the multiple power saving modes;

the power saving target;

information about the road sensing system, when the operation in accordance with the multiple power saving modes is performed;

a result of the operation in accordance with the multiple power saving modes.

* * * * *